(12) United States Patent
Ohba et al.

(10) Patent No.: US 7,327,364 B2
(45) Date of Patent: Feb. 5, 2008

(54) METHOD AND APPARATUS FOR RENDERING THREE-DIMENSIONAL IMAGES OF OBJECTS WITH HAND-DRAWN APPEARANCE IN REAL TIME

(75) Inventors: Yasuo Ohba, Yokohama (JP); Akinari Kaneko, Yokohama (JP); Hiroki Nagaoka, Yokohama (JP)

(73) Assignee: Namco Bandai Games Inc, Tokyo (JP)

( * ) Notice: Subject to any disclaimer, the term of this patent is extended or adjusted under 35 U.S.C. 154(b) by 493 days.

(21) Appl. No.: 10/661,645

(22) Filed: Sep. 15, 2003

(65) Prior Publication Data
US 2004/0056858 A1  Mar. 25, 2004

(30) Foreign Application Priority Data
Sep. 19, 2002 (JP) .............................. 2002-274158

(51) Int. Cl.
*G06T 15/50* (2006.01)
(52) U.S. Cl. ..................................................... 345/426
(58) Field of Classification Search ................. 345/426
See application file for complete search history.

(56) References Cited

U.S. PATENT DOCUMENTS

| | | | | |
|---|---|---|---|---|
| 5,592,597 A | * | 1/1997 | Kiss | ............................ 345/419 |
| 5,966,134 A | * | 10/1999 | Arias | ............................ 345/589 |
| 6,268,865 B1 | * | 7/2001 | Daniels et al. | ............... 345/582 |
| 6,549,202 B1 | | 4/2003 | Hasegawa et al. | |
| 6,988,059 B1 | * | 1/2006 | Hasegawa et al. | ........... 345/426 |

FOREIGN PATENT DOCUMENTS

| | | |
|---|---|---|
| JP | B1 2862080 | 12/1998 |
| JP | B2 3231029 | 9/2001 |
| JP | B2 3253020 | 11/2001 |

OTHER PUBLICATIONS

Barbra J. Meier, "Painterly Rendering for Animation," Aug. 4, 1996, SIGGRAPH '96 Conference Proceedings, p. 477-484.*

(Continued)

*Primary Examiner*—Ulka Chauhan
*Assistant Examiner*—Jason M Repko
(74) *Attorney, Agent, or Firm*—Oliff & Berridge, PLC

(57) ABSTRACT

An image generating method for producing a pictorial image at higher speed when a three-dimensional object is arranged in an object space. The image generating method has: generating at least one of retouched image of a three-dimensional image by arranging a plurality of brush images so as to superpose a part of the plurality of brush images on one another part of the plurality of brush images within a rendering region on which the three-dimensional object is projected on the basis of a predetermined viewpoint; generating a projection image by projecting the three-dimensional object on the basis of the predetermined viewpoint; and rendering an image of the three-dimensional object so as to reflect color information of the projection image at a part at which the retouched image is transparent by synthesizing the retouched image with the projection image.

19 Claims, 20 Drawing Sheets

OTHER PUBLICATIONS

Linda G. Shapiro and George C. Stockman, "Computer Vision," Jan. 23, 2001, p. 279-283.*

Jeff Lander, "Shades of Disney: Opaquing a 3D World," Game Developer Magazine, Mar. 2000.*

Lee Markosian, Michael A. Kowalski, Daniel Goldstein, Samuel J. Trychin, John F. Hughes, Lubomir D. Bourdev, "Real-Time Nonphotorealistic Rendering," Aug. 1997, Proceedings of the 24th Annual Conference On Computer Graphics And Interactive Techniques, p. 415-420.*

Adam Lake, Carl Marshall, Mark Harris, Marc Blackstein, "Stylized Rendering Techniques For Scalable Real-Time 3D Animation," Jun. 5, 2000, Proceedings of the First International Symposium on Non-Photorealistic Animation and Rendering, p. 13-20.*

Jeff Lander, "Shades of Disney: Opaquing a 3D World," Game Developer Magazine.*

Derek Cornish, Andrea Rowan, David Luebke, "View-Dependent Particles for Interactive Non-Photorealistic Rendering," Jun. 9, 2001, Proceedings of Graphics Interface 2001, p. 151-158.*

* cited by examiner

| SAMPLING SETTING INFORMATION ||
|---|---|
| OBJECT ID | DRAGON A |
| SAMPLING IMAGE | INTENSE NORMAL VECTOR IMAGE |
| SAMPLING TYPE | RANDOM |
| RANDOM PATTERN | RANDOM ii |
| SAMPLING CURVE | CURVE A |
| SAMPLING CURVE OFFSET QUANTITY | 3 |
| SAMPLING NUMBER | 100 |

714a — OBJECT ID
714b — SAMPLING IMAGE
714c — SAMPLING TYPE
714d — RANDOM PATTERN
714e — SAMPLING CURVE
714f — SAMPLING CURVE OFFSET QUANTITY
714g — SAMPLING NUMBER

| RETOUCH SETTING INFORMATION ||
|---|---|
| OBJECT ID | DRAGON A |
| USING BRUSH | brush_n11 |
| BRUSH SIZE | 100(%) |
| BRUSH ROLL | 60(°) |
| BRUSH MOVEMENT RANGE | 15(PIXELS) |
| BRUSH REPEAT NUMBER | 3 |
| RANDOM SETTING METHOD | EVERY FRAME |
| POSITION OFFSET RANGE | -5 ~ +5 (PIXELS) |
| POSITION OFFSET VARIATION | 2(PIXELS) |
| ROTATION OFFSET RANGE | -7 ~ +7 (°) |
| COLOR SAMPLING MATERIAL | PAINT IMAGE |
| COLOR SAMPLING CURVE | CURVE A |
| CURVE OFFSET | 3 |
| BRUSH COLOR | (R,G,B)=(112, 150, 250) |
| COLOR NUMBER | 256 |

716a — OBJECT ID
716b — USING BRUSH
716c — BRUSH SIZE
716d — BRUSH ROLL
716f — BRUSH MOVEMENT RANGE
716e — BRUSH REPEAT NUMBER
716g — RANDOM SETTING METHOD
716h — POSITION OFFSET RANGE
716j — POSITION OFFSET VARIATION
716k — ROTATION OFFSET RANGE
716m — COLOR SAMPLING MATERIAL
716n — COLOR SAMPLING CURVE
716p — CURVE OFFSET
716r — BRUSH COLOR
716s — COLOR NUMBER

747

747

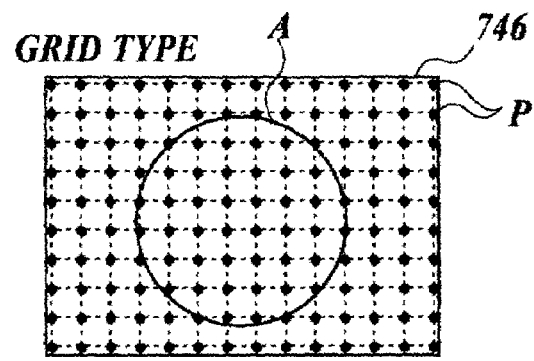
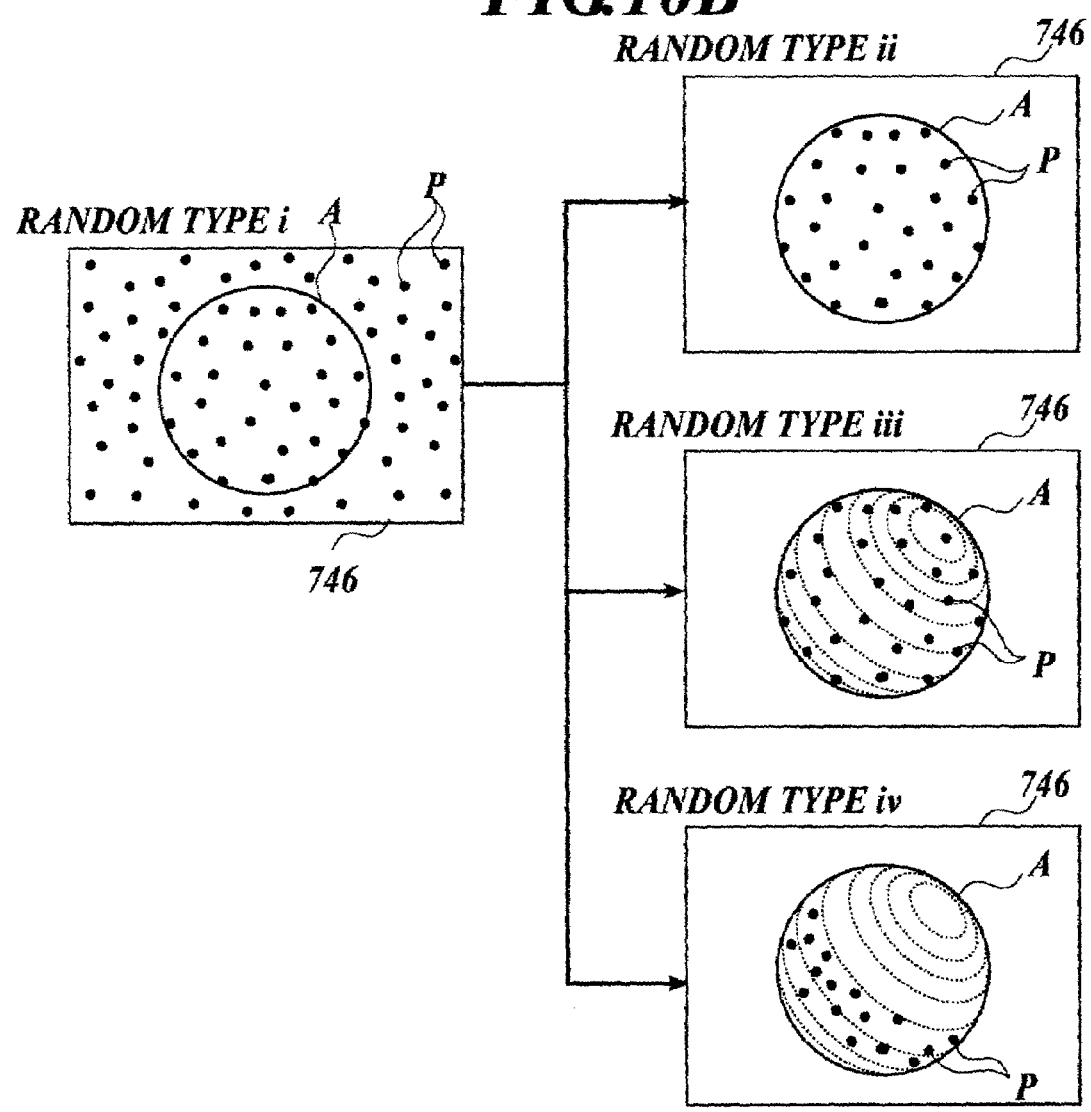

747

747

(OFFSET=0°)

(OFFSET=90°)

METHOD AND APPARATUS FOR RENDERING THREE-DIMENSIONAL IMAGES OF OBJECTS WITH HAND-DRAWN APPEARANCE IN REAL TIME

BACKGROUND OF THE INVENTION

1. Field of the Invention

The present invention relates to an image generating method and the like for rendering a three-dimensional object as seen from a given viewpoint by generating an image of the three-dimensional object and writing color information of the generated image into a rendering buffer.

2. Description of Related Art

Many recent techniques of computer graphics (hereinafter referred to as "CG" suitably) are for obtaining more realistic images, but various researches for obtaining pictorial images (hereinafter referred to "non-photorealistic rendering images (NPR images)" suitably) have been performed.

Technology development for obtaining especially cell animation style images among the pictorial images is vigorously performed. The cell animation style images are images having little gradation called as the so-called solid coating. However, full of expressions of characters can be represented by means of contours rimmed on monotonous coloring. As technologies for obtaining the cell animation style images, a technology for determining cell animation style coloring by utilizing the rendering processing of three-dimensional CG (for example, as disclosed in Japanese Patent Publication No. 3231029 corresponding to the U.S. Pat. No. 6,549,202), and a technology for generating contours (for example, as disclosed in Japanese Patent Publication No. 3253020) are known.

On the other hand, technology researches for generating handwriting style images such as oil paintings as pictorial images which are not the ones of the cell animation style, are being performed. As a technology for converting a photographic image taken on the spot to a handwriting style image, a technology for determining a shape of a touch (a brush image in the present application) by detecting edge intensity and an inclination of the edge by the use of an edge detection filter is known (for example, as disclosed in Japanese Patent Publication No. 2862080).

However, the cost (especially of time) related to image processing is enormous in the technology for generating a handwriting style image, and an effective technology for obtaining a handwriting style image for a shorter time is demanded accordingly. The technology disclosed in Japanese Patent Publication No. 2862080 also aims to obtain a handwriting style image for a shorter time. However, because the technology is for writing touches in edge directions detected by passing a photographic image taken on the spot through an edge detection filter, the technology can not always detect a contour accurately. Consequently, the phenomenon of the writing of touches in erroneous directions owing to the impossibleness of accurate extraction of a model part of the photographic image can occur.

In the three-dimensional CG, a three-dimensional object composed of a plurality of primitive surfaces (e.g. polygons) is arranged in an object space, and a two-dimensional image as seen from a given viewpoint is generated by performing the rendering of the object. Consequently, the contour parts or the like of the three-dimensional object can be specified in the coordinate system of the object space. Further, because the three-dimensional object is arranged in the object space in which the coordinate system is defined, the coordinates of a desired position can be accurately obtained by operation. Incidentally, these coordinate calculations cause a problem of being costly (especially in time). In particular, when an image is generated in real time (in the case where an image is generated at every frame) in a game machine or the like, the problem of costs (especially of time) is serious.

SUMMARY OF THE INVENTION

An object of the present invention is to produce a pictorial image at higher speed in case where a three-dimensional object is arranged in an object space.

In accordance with a first aspect of the present invention, an image generating method for rendering a three-dimensional object viewed from a predetermined viewpoint by generating an image of the three-dimensional object and writing color information on the image generated in a rendering buffer, comprises: generating at least one of retouched image of the three-dimensional image by arranging a plurality of brush images so as to superpose a part of the plurality of brush images on one another part of the plurality of brush images within a rendering region for the three-dimensional object, the rendering region on which the three-dimensional object is projected on the basis of the predetermined viewpoint; generating a projection image by projecting the three-dimensional object on the basis of the predetermined viewpoint; and rendering the image of the three-dimensional object so as to reflect color information of the projection image at a part at which the retouched image is transparent by synthesizing the retouched image with the projection image.

In accordance with a second aspect of the present invention, an image generating apparatus for rendering a three-dimensional object viewed from a predetermined viewpoint by generating an image of the three-dimensional object and writing color information on the image generated in a rendering buffer, comprises: a retouched image generating section for generating at least one of retouched image of the three-dimensional image by arranging a plurality of brush images so as to superpose a part of the plurality of brush images on one another part of the plurality of brush images within a rendering region for the three-dimensional object, the rendering region on which the three-dimensional object is projected on the basis of the predetermined viewpoint; a projection image generating section for generating a projection image by projecting the three-dimensional object on the basis of the predetermined viewpoint; and a rendering section for rendering the image of the three-dimensional object so as to reflect color information of the projection image at a part at which the retouched image is transparent by synthesizing the retouched image with the projection image.

Herein, in the present specification, the "rendering" means to write color information in the rendering buffer (for example, a frame buffer). The rendering region means a region in which the three-dimensional object is rendered in the image.

According to the image generating method of the first aspect or the image generating apparatus of the second aspect of the present invention, because the retouched image is generated by arranging the plurality of brush images, the light and shade of the retouched image can be exhibited according to the number of superposed brush images or the like. Incidentally, because color information of the brush images is not reflected at a part where the brush images are not arranged or the number of superposed brush images is small, the part becomes a transparent part. However, by synthesizing the projection image with the retouched image, color information of a surface of the three-dimensional object is reflected at the transparent part. Consequently, it is not necessary for generating the retouched image by spreading the brush images all over the surface. For example, by generating the retouched image in which the brush images are arranged at a part of the surface of the three-dimensional object, the costs (processing time) for generating the retouched image is decreased, and further the image of the whole three-dimensional object can have a pictorial tone.

The projection image generated may be an image to which shading (shading processing) is performed or an image to which the shading is not performed. Further, the projection image may be a cell animation style image in which color information is reduced.

Preferably, the image generating method of the first aspect of the present invention, further comprises generating an edge image of the three-dimensional object on the basis of the predetermined viewpoint, wherein the rendering the image of the three-dimensional object includes rendering the image of the three-dimensional object by synthesizing the retouched image, the projection image and the edge image.

According to the image generating method, the image of the three-dimensional object is synthesized with the edge image generated. Consequently, it is possible to give a cell animation style tone to the pictorial image of the three-dimensional object. Incidentally, the synthesis ratio and the synthesis order of the retouched image, the projection image or the edge image may be arbitrarily set. For example, the synthesis ratio may be set so as to color the image of the three-dimensional object with color information of the edge image preferentially, or the synthesis order may be set so as to emphasize the edge more by performing processing for overwriting the color information of the edge image at the last.

Preferably, the image generating method of the first aspect of the present invention, further comprises: setting a light source in an object space in which the three-dimensional object is provided; and calculating shadow information of the three-dimensional object by performing predetermined rendering processing on the basis of the predetermined viewpoint and the light source set, wherein the arranging a plurality of brush images so as to superpose a part of the plurality of brush images on one another part of the plurality of brush images includes determining arrangement positions at which the plurality of brush images are arranged on the basis of the shadow information calculated.

According to the image generating method, the arrangement positions of the brush images are determined on the basis of information on a shadow of the three-dimensional object, the shading formed based on the light source in the object space. The more the brush images are arranged to be superpose a part on one another part when arranging the brush images, the denser the color of the brush images are reflected on the image of the three-dimensional object.

More preferably, in the image generating method as described above, the arranging a plurality of brush images so as to superpose a part of the plurality of brush images on one another part of the plurality of brush images includes determining the arrangement positions for the plurality of brush images so that density of the plurality of brush images in a low brightness part is higher than density of the plurality of brush images in a high brightness part on the basis of the shadow information calculated.

Preferably, in the image generating method as described above, the arranging a plurality of brush images so as to superpose a part of the plurality of brush images on one another part of the plurality of brush images includes arranging the plurality of brush images at positions which satisfy a predetermined brightness condition within the rendering region on the basis of the shadow information calculated.

According to the image generating method, for example, when the brush images are arranged only at a part having brightness which is equal to predetermined brightness or lower, color information of the projection image is expressed at a part having brightness which is higher than the predetermined brightness. Consequently, because a part having visual effects in the shadow (light and dark) exhibited on the image of the three-dimensional object can be distinguished on the basis of brightness information, it is possible to generate a pictorial image effective in application to various situations at higher speed.

More preferably, in the image generating method as described above, the arranging a plurality of brush images so as to superpose a part of the plurality of brush images on one another part of the plurality of brush images includes generating a first retouched image by arranging the plurality of brush images at positions which satisfy a first brightness condition and generating a second retouched image by arranging the plurality of brush images at positions which satisfy a second brightness condition within the rendering region on the basis of the shadow information.

According to the image generating method, because different retouched images can be generated according to the shadow state, it is possible to generate a more effective pictorial image.

Preferably, in the image generating method as described above, the generating at least one of retouched image of the three-dimensional image includes generating at least one of retouched image by changing brightness information of the plurality of brush images on the basis of shadow information at positions at which the plurality of brush images are arranged.

According to the image generating method, because the brightness of the brush images at a part where the brightness of the three-dimensional object is low is set to be low, and the brightness of the brush images at a part where the brightness of the three-dimensional object is high is set to be high, it is possible to express the shadow of the three-dimensional object in the object space more accurately.

Preferably, in the image generating method of the first aspect of the present invention, the generating at least one of retouched image of the three-dimensional image includes: operating a normal line to a surface of the three-dimensional object; and performing processing for determining an arrangement angle of each of the plurality of brush images on the basis of the normal line operated for a position on the surface of the three-dimensional object, the position corresponding to an arrangement position at which each of the plurality of brush images is arranged, and arranging each of the plurality of brush images at the arrangement angle determined.

More preferably, the operating a normal line to a surface of the three-dimensional object includes operating the normal line to the surface of the three-dimensional object by providing a first light source for emitting light rays in a first direction crossing at a right angle with an eyes line direction of the predetermined viewpoint and a second light source for emitting light rays in a second direction crossing at a right angle with the eyes line direction of the predetermined viewpoint, irradiating the light rays emitted from the first light source and the light rays emitted from the second light source to the three-dimensional object, executing predetermined rendering processing on the basis of the predetermined viewpoint, and generating a normal image expressing the normal line to the surface of the three-dimensional object in color information, and the arranging each of the plurality of brush images includes performing processing for determining the arrangement angle of each of the plurality of brush images, on the basis of color information at a position of the normal image, the position corresponding to the arrangement position at which each of the plurality of brush images is arranged, and arranging each of the plurality of brush images at the arrangement angle determined.

According to the image generating method, because the normal image to be generated is an image expressing the normal line to the surface of the three-dimensional object in the color information, it is possible to simply realize the generation of the retouched image, for example, by arranging the brush images at the arrangement angle along the surface of the three-dimensional object. To put it concretely, because the light rays emitted from the first light source and the second light source in two directions crossing at right angles with the eyes line direction are irradiated to the three-dimensional object, the color information of the surface of the three-dimensional object which is expressed by the light rays in the two directions becomes information corresponding to the normal line as it is. That is, when the three-dimensional object is seen from the viewpoint, it is possible to estimate an angle of the surface of the three-dimensional object to the first direction on the basis of the color information of the light ray emitted from the first light source, and an angle of the surface of the three-dimensional object to the second direction on the basis of the color information of the light ray emitted from the second light source. Consequently, the direction of the normal line to the surface of the three-dimensional object as seen from the viewpoint is expressed in the color information on the normal image. The rendering processing itself which is executed is similar to well-known rendering processing, and can be executed by hardware such as a digital signal processor (DSP) called as a so-called rendering engine, or the like, which is mounted in a general image generation apparatus. In the image generation apparatus in which such hardware is mounted, the present invention is more effective.

Further, processing for arranging the brush images may be performed to define, for example, a standard direction and a rotation center point to each brush image in advance and to determine an arrangement direction of the brush image on the basis of the standard direction and the rotation center point of the brush image and the arrangement angle.

Preferably, in the image generating method as described above, the rendering buffer is formed so as to store RGB values for every pixel, the operating the normal line to the surface of the three-dimensional object includes generating the normal image by setting a light ray color of the first light source to be a first color of RGB and a light ray color of the second light source to be a second color of the RGB other than the first color, executing the predetermined rendering processing, and operating RGB values of each of pixels of the surface of the three-dimensional object, and the arranging each of the plurality of brush images includes determining the arrangement angle of each of the plurality of brush images at the arrangement position at which each of the plurality of brush images are arranged by operating a direction corresponding to the normal line at the arrangement position at which each of the plurality of brush images is arranged on the basis of a value of the light ray color of the first light source and a value of the light ray color of the second light source of RGB values of the normal image.

According to the image generating method, the rendering buffer stores the RGB values for every pixel (the RGB in the present specification means red, green and blue of the three primary colors, respectively). As a result, when the light ray color of the first light source is, for example, the R (red) and the light ray color of the second light source is, for example, the G (green), the normal image is expressed in the color values of the R and the G. Consequently, because the direction corresponding to the normal line can be operated by reading the color values of the R and the G of the normal image when operating the direction, it is possible to operate the direction corresponding to the normal line easily.

When the light ray direction of the first light source and the light ray direction of the second light source is set so as to cross with each other at right angles, it is possible to operate the direction corresponding to the normal more easily.

Preferably, the image generating method as described above, further comprises operating a direction from a predetermined position of the normal image generated to the arrangement position at which each of the plurality of brush images is arranged, wherein the determining the arrangement angle of each of the plurality of brush images includes determining the arrangement angle of each of the plurality of brush images by synthesizing the direction operated with a direction obtained on the basis of the color information of the normal image.

For example, when the viewpoint looks squarely at the three-dimensional object, the three-dimensional object is rendered at the center part of the image. On the other hand, when the viewpoint looks obliquely at the three-dimensional object, the three-dimensional object is not rendered at the center part of the image. That is, the center position of the image is the direction of the eyes line of the viewpoint. Incidentally, in case one three-dimensional object is pictorially expressed, if the brush images can be arranged in a circular arc state having a substantial center position of the three-dimensional object as the center of the circular arc, it is possible to realize expression having a more stereoscopic effect. Consequently, for example, when the predetermined position of the normal image is set at the center of the three-dimensional object of the normal image, it is possible to realize the expression.

Further, when the predetermined position of the normal image is set at a position of a gaze point, it is also possible to correct the arrangement angles of the brush images so as to arrange the brush images in a circle arc state having the gaze point as the center of the circle arc. In the case, because a pattern of the image (a pattern of the brush images) having the gaze point as its center is expressed, it is possible to entice an eyes line of a viewer. Incidentally, a synthesis ratio for synthesizing the directions can be suitably set. For example, when the predetermined position is set at the position of the gaze point, the synthesis ratio may be changed according to desired extent of turning the eyes line of the viewer to the gaze point. For example, the extent of gazing to the gaze point may be set in advance, and the synthesis ratio may be changed according to the extent of gazing.

Preferably, the image generating method as described above, further comprises setting a light source in an object space in which the three-dimensional object is provided; wherein the arranging each of the plurality of brush images includes determining the arrangement angle of each of the plurality of brush images by synthesizing a light ray direction of the light source set with the normal line to the surface of the three-dimensional object.

According to the image generating method, the arrangement angle of each brush image is determined in consideration for the light ray direction of the light source in the object space in which the three-dimensional object is provided. Consequently, it is possible to generate an image having no contradiction in consideration of the light source in the object space.

A more detailed description thereof will be given. For example, the case where the brush images are arranged along the surface of the three-dimensional object will be considered. When the image generating method is not applied, an image wherein a pattern of the brush images is showed along a shape of the surface of the three-dimensional object is generated. However, there is the possibility that the image has a contradiction in some states of the radiation of the light in the object space. The situation will now be described more concretely. Because the light source is very important element in the image, it is normal to express a bright part with a light color tone and a dark part with a dark color tone. However, when the brush images are arranged along the surface of the three-dimensional object independently of the light and shade state of light, a pattern unrelated to the light and shade state of light is drawn on the surface of the three-dimensional object according to the pattern of the brush images. The pattern gives a viewer a feeling that something is wrong. According to the image generating method, the arrangement angle of each brush image is, so to speak, corrected according to the light ray direction of the light source set in the object space. As a result, it is possible to remove the feeling that something is wrong, and to generate an image having no contradiction in consideration of the light source in the object space.

Preferably, in the image generating method of the first aspect of the present invention, the generating at least one of retouched image of the three-dimensional image includes generating at least one of retouched image by changing a number of brush images to be arranged according to a predetermined condition.

According to the image generating method, the number of brush images to be arranged can be changed according to various conditions. For example, the number of brush images can be changed according to brightness of the surface of the three-dimensional object. That is, it is possible to generate a pictorial image at higher speed by setting a condition in consideration of costs (processing time or degree of pictorial sight).

Preferably, in the image generating method of the first aspect of the present invention, the generating at least one of retouched image of the three-dimensional image includes generating at least one of retouched image by changing a size of each of the plurality of brush images to be arranged according to a predetermined condition.

According to the image generating method, it is possible to change the size of each brush image to be arranged according to various conditions. For example, it is possible to change the size of the brush image according to a distances from the center of the rendering region for the three-dimensional object (for example, the size may be larger in proportion as the brush image becomes far). Further, it is possible to change the size of the brush image according to the brightness of the surface of the three-dimensional object (for example, the size may be smaller in proportion as the brightness becomes lower). That is, it is possible to generate a pictorial image at higher speed by setting a condition in consideration of costs (processing time or degree of pictorial sight).

Preferably, the image generating method of the first aspect of the present invention, further comprises storing information on the plurality of brush images, wherein the generating at least one of retouched image of the three-dimensional image includes generating at least one of retouched image by selecting any one brush image to be arranged of the plurality of brush images according to a predetermined condition.

According to the image generating method, because the three-dimensional object is rendered by changing the brush image to be arranged, it is possible to generate variously touched images of the three-dimensional object. The condition of selecting the brush image may be, for example, one corresponding to the brightness of the three-dimensional object in the object space. That is, a first brush image is selected at a position (a sampling position) having brightness which reaches a threshold value, and a second brush image is selected at a position (a sampling position) having brightness which does not reach the threshold value. By setting the first brush image to be an image having higher brightness or a larger size in comparison with those of the second brush image, respectively, it is possible to express the shadow of the three-dimensional object in the object more accurately.

Preferably, in the image generating method of the first aspect of the present invention, the arranging a plurality of brush images so as to superpose a part of the plurality of brush images on one another part of the plurality of brush images includes arranging the plurality of brush images so as to superpose a part of a predetermined number of brush images of the plurality of brush images on one another part of the plurality of brush images in a predetermined direction from a position at which any one brush image of the plurality of brush images when arranging the plurality of brush images.

According to the image generating method, for example, because the plurality of brush images can be arranged so as to superpose a part of the brush images on one another part of the brush images at an arrangement position of one brush image, it is possible to realize generation of a pictorial image at higher speed. Further, when the direction corresponding to the normal line of the arrangement position of the brush image can be obtained, the plurality of brush images may be arranged so as to superpose a part of the brush images on one another part of the brush images in the direction corresponding to the normal line. In the case, it is possible to realize high speed rendering and the generation of the image along the surface of the three-dimensional object which dose not cause a feeling that something is wrong.

More preferably, in the image generating method as described above, the arranging a plurality of brush images so as to superpose a part of the plurality of brush images on one another part of the plurality of brush images includes arranging the plurality of brush images so as to superpose the part of the predetermined number of brush images of the plurality of brush images on one another part in the predetermined direction based on an arrangement angle of any one brush image of the plurality of brush images when arranging the plurality of brush images.

According to the image generating method, it is possible to realize high speed rendering and the generation of the image which causes little feeling that something is wrong.

Preferably, in the image generating method of the first aspect of the present invention, the generating at least one of retouched image of the three-dimensional image includes generating at least one of retouched image by shifting positions at which the plurality of brush images are arranged as time passes.

According to the image generating method, even when the three-dimensional object or the viewpoint is not moving, it is possible to give the sensation that a pictorial three-dimensional object exists (the sensation that the surface of the three-dimensional object is buzzing) by shifting the arrangement positions of the brush images.

Preferably, in the image generating method of the first aspect of the present invention, the generating at least one of retouched image of the three-dimensional image includes generating at least one of retouched image by shifting arrangement angles of the plurality of brush images as time passes.

According to the image generating method, even when the three-dimensional object or the viewpoint is not moving, it is possible to give the sensation that a pictorial three-dimensional object exists (the sensation that the surface of the three-dimensional object is buzzing) by shifting the arrangement angles of the brush images.

In accordance with a third aspect of the present invention, a storage medium has information recorded thereon, when the information is loaded onto an operating apparatus, the information making the operating apparatus execute the method of the first aspect of the present invention.

In accordance with a fourth aspect of the present invention, a data signal embodied in a carrier wave, comprises information used for executing the method of the first aspect of the present invention.

In accordance with a fifth aspect of the present invention, when a program is loaded onto an operating apparatus, the program makes the operating apparatus execute the method of the first aspect of the present invention.

BRIEF DESCRIPTION OF THE DRAWINGS

The present invention will become more fully understood from the detailed description given hereinafter and the accompanying drawing given by way of illustration only, and thus are not intended as a definition of the limits of the present invention, and wherein:

FIG. 4 is a view showing an example of the data structure of sampling setting information 714;

FIG. 5 shows a view showing an example of the data structure of retouch setting information 716;

FIGS. 10A and 10B are conceptual diagrams for explaining random patterns;

PREFERRED EMBODIMENTS OF THE INVENTION

The preferred embodiment to which the present invention is applied will be described with reference to FIGS. 1-20. In the present embodiment, the case where a game screen is configured by the use of NPR images including handwriting style touches in a video game rendering three-dimensional computer graphics (3DCG) in real time is exemplified for description. Incidentally, the application of the present invention is not limited to the game screen, but the invention can be similarly applied to the case of generating a moving image by means of the 3DCG also.

Description of Structure

Figure 1:
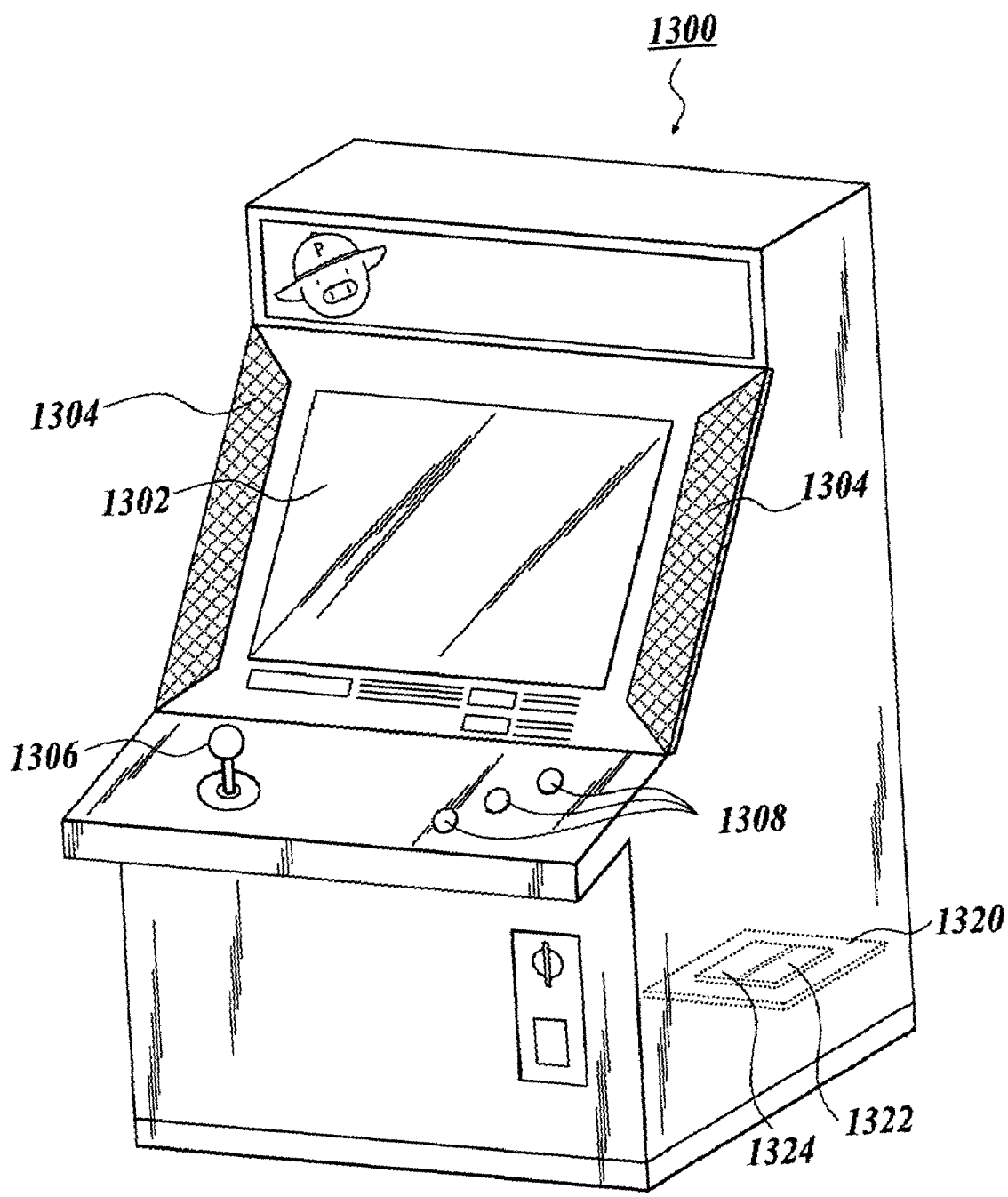
FIG. 1 is a view showing an example of an external appearance of an arcade game apparatus 1300 to which the present invention is applied.

FIG. 1 is a view showing an example of an external appearance of an arcade game apparatus 1300 to which the present invention is applied. As shown in FIG. 1, the game apparatus 1300 comprises a display 1302 for display a game screen as an image, speakers 1304 for outputting sound effects or back ground music (BGM) of a game, a joy stick 1306 and push buttons 1308, both for inputting operations front, rear, right and left directions, and a control unit 1320 for controlling the arcade game apparatus 1300 in an integrated way by performing operation processing to execute a given game.

An integrated circuit (IC) memory 1322 for storing programs or data necessary to execute a game, and programs or data for generating a handwriting style NPR image; and a rendering buffer 1324 for storing information to be displayed on the display 1302 as an image, are mounted on the control unit 1320.

A player enjoys playing the game by inputting operations with the joy stick 1306 or inputting various types of commands with the push buttons 1308 while watching the game screen displayed on the display 1302.

Description of Method for Generating NPR Image with Handwriting Style Touches

Figure 2:
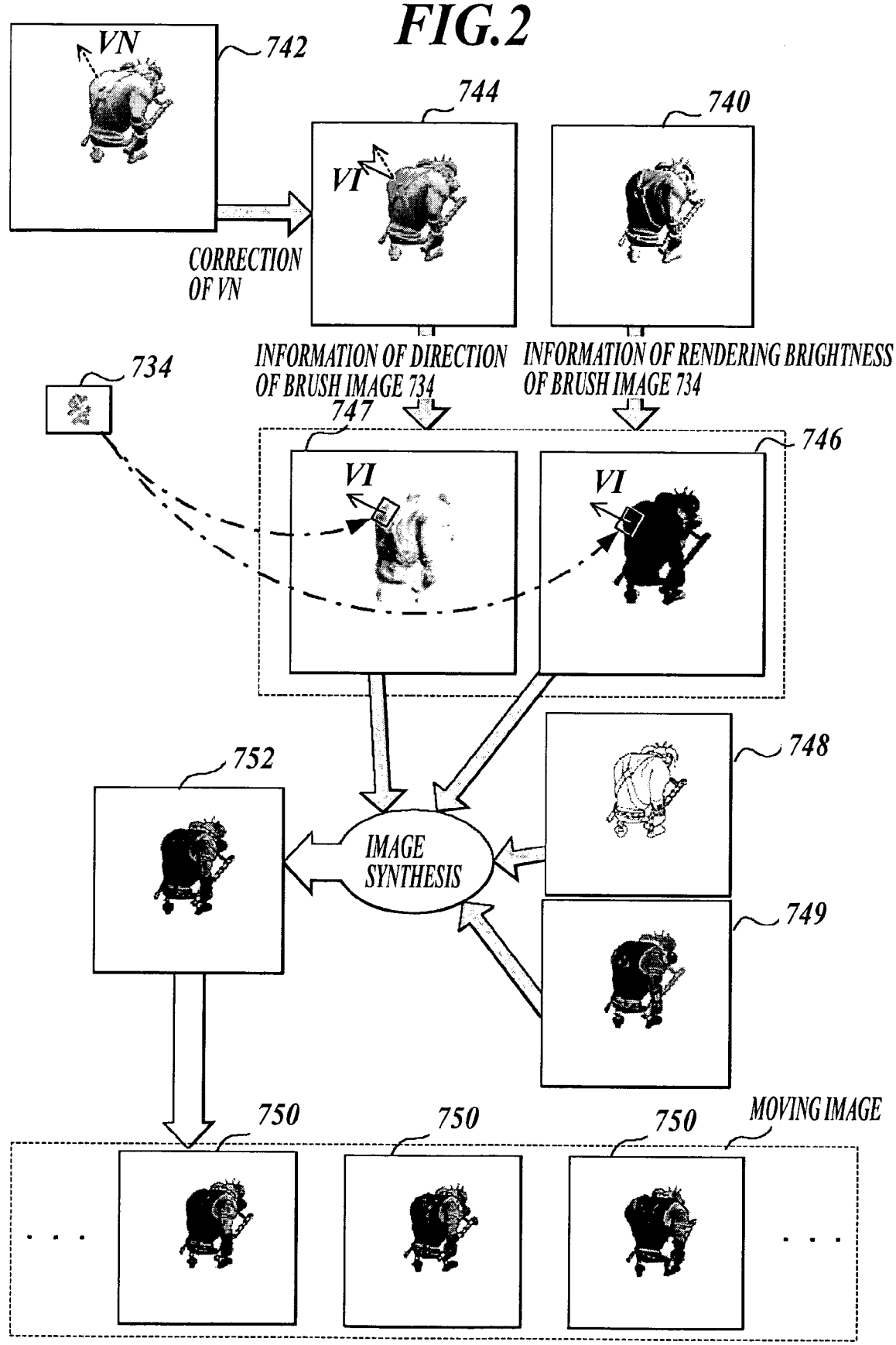
FIG. 2 is a view for illustrating an outline of generation of game screens.

FIG. 2 is a view for illustrating an outline of generation of a game screen in the present embodiment. The moving image for the game screen looks like a moving picture by displaying, for example, eight frame images 750 for a second continuously on the display 1302.

In the present embodiment, one frame image 750 is generated by synthesizing a paint image 749 with a highlight retouched image 746, a shadow retouched image 747 and an edge image 748.

The paint image 749 is a color image of an object in the state of having no shades.

The edge image 748 is a line drawing showing edges of the object. The edge image 748 corresponds to a line drawing of a cell animation or a cartoon.

The highlight retouched image 746 and the shadow retouched image 747 are gray scale images in which the light and shade corresponding to touches is rendered (they may be color images as described later). The highlight retouched image 746 and the shadow retouched image 747 are generated on the basis of a shaded image 740 and an intense normal vector image 744. The intense normal vector image 744 is further generated on the basis of a normal vector image 742.

The outline of the generation order will be described. First, the game apparatus 1300 generates the shaded image 740 and the normal vector image 742.

The shaded image 740 is also called as a shade image. In the present embodiment, the shaded image 740 is a gray scale image including a surface which receives light from a light source to have high brightness (light) and a shadow part having low brightness (dark). The normal vector image 742 is a color image including normal information of polygon surfaces constituting an object A as RGB values (brightness values of the three primary colors of red, green and blue) which are color information of pixels. The normal vector image 742 is also called as a normal map or a normal image.

A normal vector VN can be obtained from the normal vector image 742. The normal vector VN is a normal vector corresponding to each coordinate of the polygon surfaces constituting the object when the polygon surfaces are projected on the XY-plane of the screen coordinates. The game apparatus 1300 corrects the normal vector VN on the basis of a direction of a light ray and a direction of an eyes line, and sets the corrected normal vector VN as an intense normal vector VI. The image storing the vector values of the intense normal vector VI as the RGB values being the color information of the pixels is the intense normal vector image 744.

Then, the game apparatus 1300 obtains the intense normal vector VI on the basis of the color information of the intense normal vector image 744. Then, the game apparatus 1300 rotates a brush image 734 in the direction of the intense normal vector VI to render the rotated brush image 734 to a given sampling point P at the light and shade in proportion to the brightness of the shaded image 740. Thereby, the game apparatus 1300 generates the highlight retouched image 746 and the shadow retouched image 747 (see FIGS. 8A-8F).

The highlight retouched image 746 and the shadow retouched image 747 are generated by rendering the brush image 734 to the region in which the brightness of the shaded image 740 is comparatively light and the region in which the brightness is comparatively dark (rendering region), respectively.

Then, a highlight is rendered in the handwriting style by, for example, performing the multiplication synthesis of the paint image 749 with the highlight retouched image 746. Further, a shadow (shading) is rendered in the handwriting style by performing the screen synthesis of the shadow retouched image 747. Then, the paint synthesis of the edge image 748 is performed. By the processing described above, an object synthesis image 752 is generated. The object synthesis image 752 is one frame image 750.

By repeating such synthesis in real time, a plurality of frame images 750 based on handwriting style NPR images are successively generated, and a moving image of a game screen can be produced.

Incidentally, the "multiplication synthesis" hereupon means the synthesis method for multiplying color information (basic color) of an image to be synthesized by color information (synthesis color) of a synthesizing image. When the synthesis color is black, the synthesis result becomes dark. When the synthesis color is white, the basic color remains as it is.

Further, the "screen synthesis" hereupon means the synthesis method for multiplying the color information (basic color) of the image to be synthesized by each inverted color of the color information (synthesis color) of the synthesizing image. When the synthesis color is black, the basic color remains as it is. When the synthesis color is white, the synthesis result becomes light.

Description of Functional Block

Figure 3:
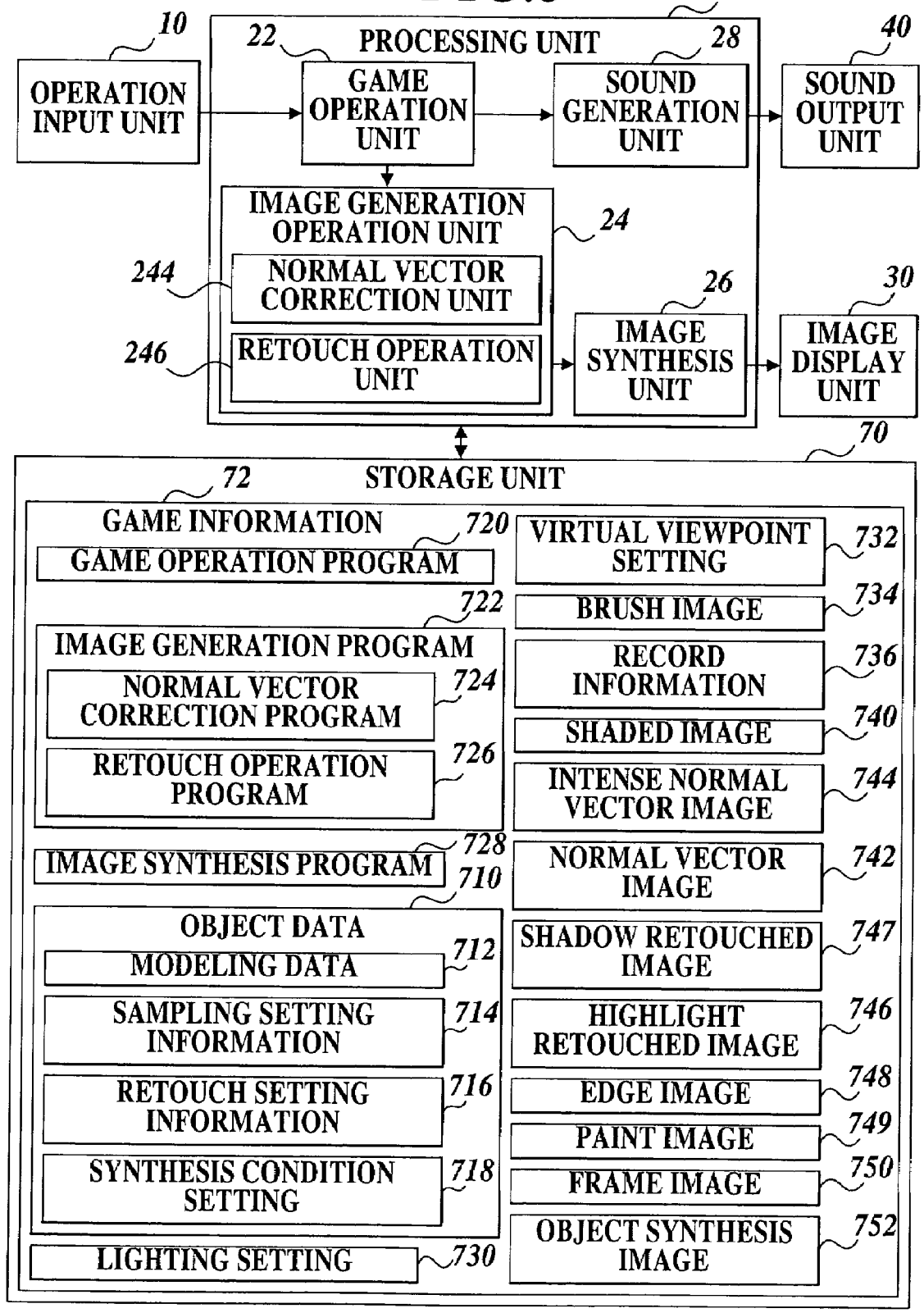
FIG. 3 is a function block diagram showing an example of a function structure of the game apparatus 1300.

FIG. 3 is a functional block diagram showing an example of the functional structure of the game apparatus 1300 of the present embodiment. As shown in FIG. 3, the game apparatus 1300 comprises an operation input unit 10, a processing unit 20, an image display unit 30 and a storage unit 70.

The operation input unit 10 accepts operation inputted by the user. The operation input unit 10 is implemented by, for example, a switch, a lever, a track pad, a dial, a tablet or the like. The joy stick 1306 or the push buttons 1308 of FIG. 1 corresponds to the operation input unit 10.

The processing unit 20 executes various pieces of operation processing on the basis of a predetermined program, and unitedly controls functions of the game apparatus 1300. The processing unit 20 further executes image generation and image processing by means of an image generation operation unit 24. The functions of the processing unit 20 are implemented by, for example, hardware such as a CPU (of a complex instruction set computer (CISC) type, or of a reduced instruction set computer (RISC) type), an ASIC (a gate array or the like) or the like and related control programs or the like. The operation processing unit 1320 of FIG. 1 corresponds to the processing unit 20.

In the present embodiment, the processing unit 20 comprises a game operation unit 22 for performing game operation, an image generation operation unit 24 for generating various image data on the basis of results of the game operations, an image synthesis unit 26 for synthesizing the images generated by the image generation operation unit 24 to generate a frame image 750, and a sound generation unit 28 for generating signals of game sounds.

The game operation unit 22 arranges objects (such as a character, a background or the like), a light source, and a virtual viewpoint in a virtual space (an object space) to form a game space. Then, the game operation unit 22 rearranges the objects in accordance with a given game rule on the basis of the operation signals inputted through the operation input unit 10. Further, the game operation unit 22 also executes collision judgment, operation of game results, or the like. That is, by the game operation unit 22, the operation according to the rules of the game, and the geometry operation of the objects in the virtual space are executed.

The image generation operation unit 24 executes shading processing and rendering processing on the basis of the results operated by the game operation unit 22. Then, the image generation operation unit 24 generates various image data of the paint image 749, the highlight retouched image 746, the shadow retouched image 747, the edge image 748, the normal vector image 742, the shaded image 740 and the like.

Any of the shaded image 740, the paint image 749 and the edge image 748 can be suitably produced by the shading function and the rendering function which are implemented by known 3DCG software or the like. In any case, there is no need for rendering the shaded image 740, the paint image 749 and the edge image 748 after performing full color realistic shading to them. Only the limited light source and the limited color information are the objects to be processed. Consequently, the images can be generated rapidly by performing little operation processing.

The normal vector image 742 is called a normal map. The normal vector image 742 is a color image having XYZ vector values being normal information of polygon surfaces constituting the object A as RGB values being color information. The normal vector image 742 is sometimes called as a normal map or a normal image.

Figure 6:
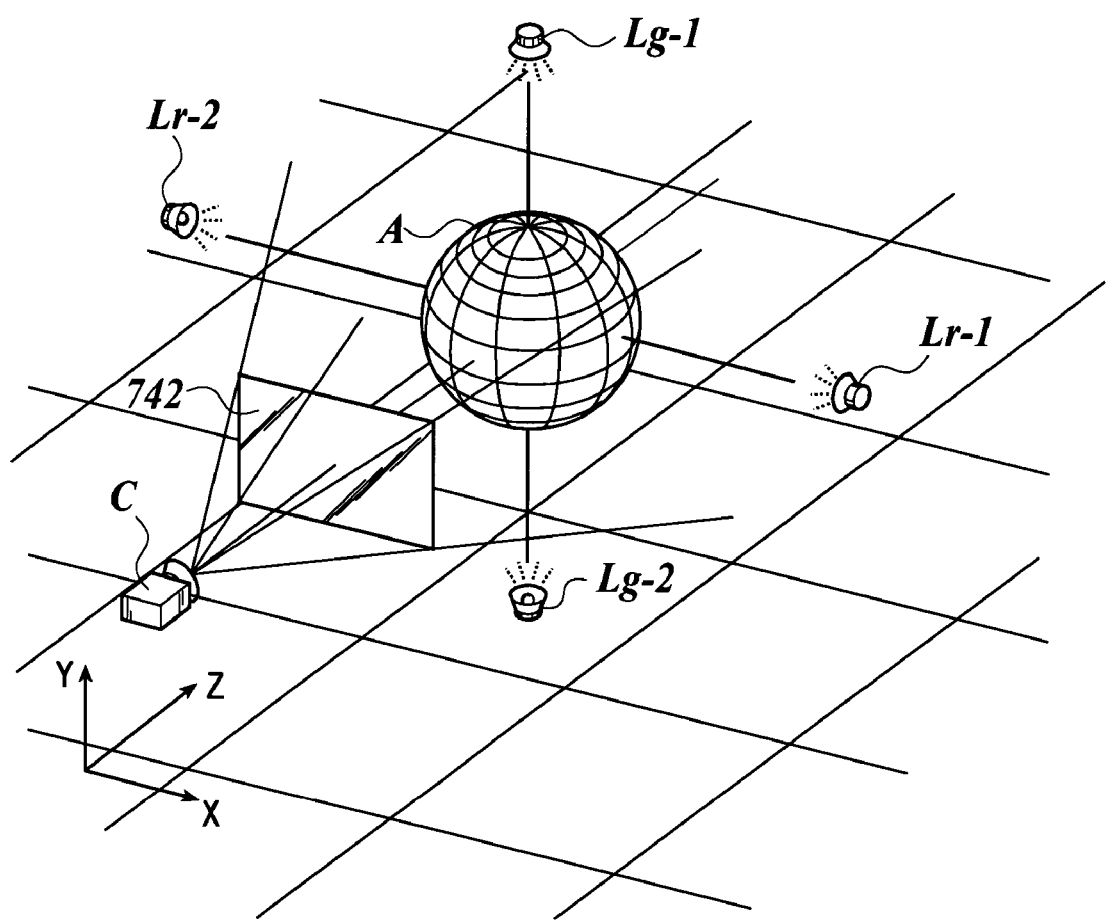
FIG. 6 is a view for explaining the concept of a method for generating a normal vector image 742.

FIG. 6 is a view for explaining the concept of a method for generating the normal vector image 742 in the present embodiment. The material attribute of the object A is set to have, for example, 1.0 (100%) of ambient components of all of the colors of RGB and also 1.0 (100%) of diffuse components of all of the colors of RGB. Then, as shown in FIG. 6, a red color parallel ray light source Lr-1 having the brightness of +50% is set in the plus direction of the X-axis, and a red color parallel ray light source Lr-2 having the brightness of −50% is set in the minus direction of the X-axis, on the basis of the local coordinates of a virtual viewpoint. Similarly, a green color parallel ray light source Lg-1 having the brightness of +50% is set in the plus direction of the Y-axis, and a green color parallel ray light source Lg-2 having the brightness of −50% is set in the minus direction of the Y-axis.

Then, when shading and rendering are performed in this state, the light which has been irradiated to the object A in the X direction and the Y direction is reflected in the specular direction (right in the front) at the strongest intensity to each parallel ray light source, and the light becomes weaker as it shifts from the direction. That is, the brightness value of the pixel is "127" (50% of "255") in the specular direction, and is "0" in the direction of a right angle to the parallel rays. Further, the brightness values include "− (minus)" in the positions toward the minus direction of each axis. Consequently, the brightness values of the pixel of the rendered image have the values within the range of "−127 to 128 (width: 256)". The image generation operation unit 24 adds "127" to the brightness values to correct the brightness values to be ones within the range of "0 to 255", and stores the corrected brightness values in the R values and the G values of the color information of the pixels of the normal vector image 742.

Herein, the normal vector VN will be explained. Because the normal vector VN is a normal vector to a polygon surface constituting the object, the size of the normal vector VN is "1".

Therefore, the normal direction projected at the time when the polygon surface is projected on the XY-plane can be calculated on the basis of the R value and the G value of each pixel of the rendered image, to make the brightness value "255" correspond to the vector value "1", to make the brightness value "127" correspond to the vector value "0" and to make the brightness value "0" correspond to the vector value "−1". For example, the R and G values of a surface perpendicular to the XY-plane facing the plus direction of the X-axis are (255, 127), and the vector values thereof are (1, 0). Accordingly, the normal vector VN is a two-dimensional vector composed of X components and Y components.

In the present embodiment, when the normal vector image 742 is generated, the B value of color information is not used as an operation object. The reason is that when the highlight retouched image 746 or the shadow retouched image 747 is generated as follows, the retouch operation unit 246 performs operation based on the orientation vectors of the surface of the object projected on the XY-surface of the screen coordinates in, which will be described later. Consequently, in order to generate the normal vector image 742, the image generation operation unit 24 can generate the normal vector image 742 only by setting a simple condition for setting the parallel ray light sources in the X-axis direction and the Y-axis direction severally, and by performing the operation to values other than the B values of color information. Further, it is supposed that "255" is stored in the α value of each of pixels in which the object is rendered and, that "0" is stored in the α value of each of pixels in which the object is not rendered, as mask information for distinguishing whether the object is rendered or not.

The normal vector image 742 is not limited to be generated according to the above-described method. The normal vector image 742 may calculated based on polygon data of the object suitably.

In the present embodiment, the image generation operation unit 24 further comprises a normal vector correction unit 244 and the retouch operation unit 246.

The normal vector correction unit 244 corrects the normal vectors VN stored as the R value and the G value of the color information of each pixel of the normal vector image 742 according to (1) the light ray directions of the light sources set in the virtual space and (2) the positional relationship between the image center Ob and each pixel, to generate an intense normal vector image 744.

Figure 7:
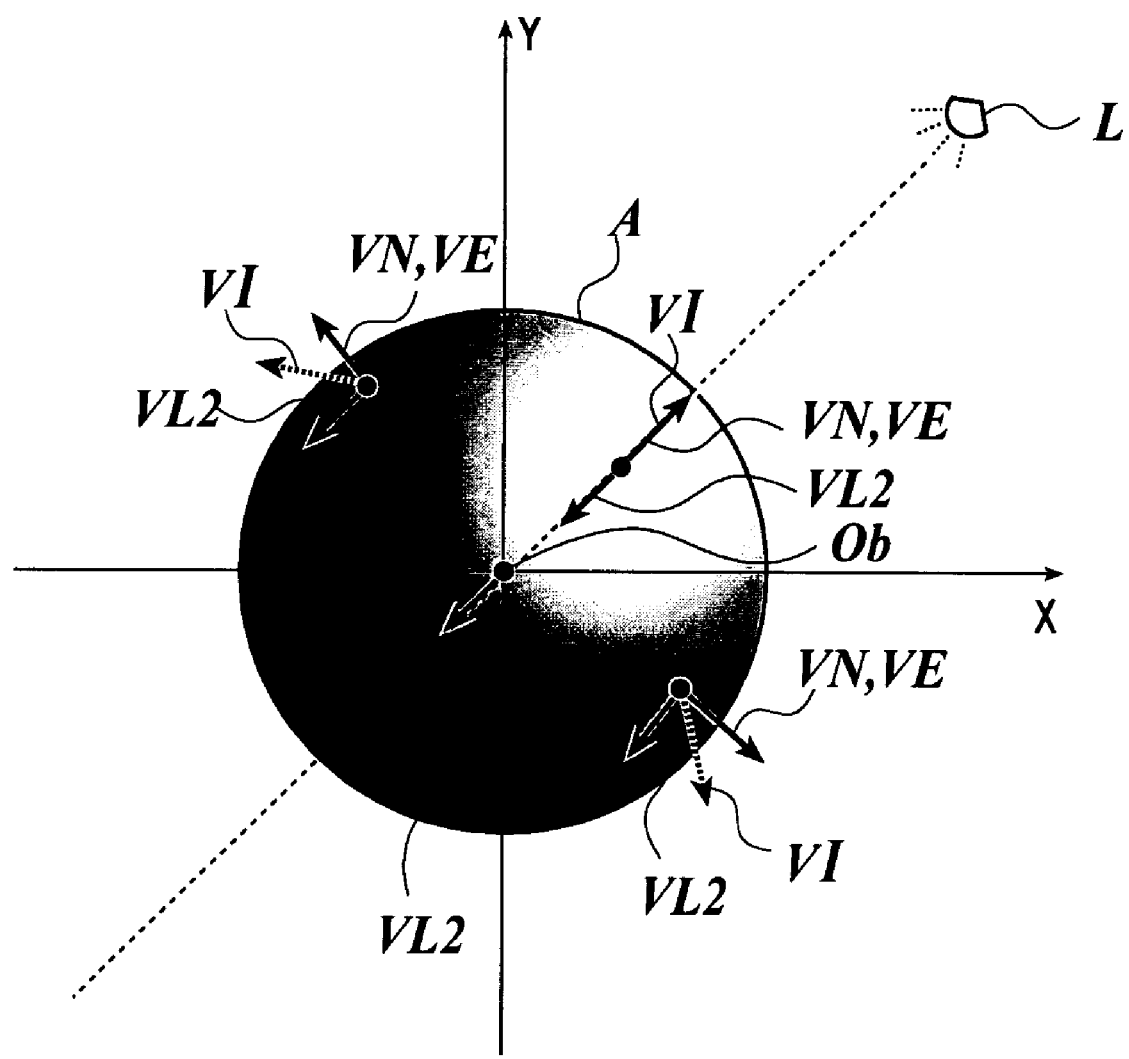
FIG. 7 is a view for explaining the concept of corrections of normal vectors.

FIG. 7 is a view for explaining the concept of the correction of normal vectors in the screen coordinates, in the present embodiment.

As shown in FIG. 7, the normal vector correction unit 244 first obtains the normal vectors VN on the basis of the R values and the G values of the color information of the pixels of the normal vector image 742, regarding all of the pixels for rendering the object A. Further, the normal vector correction unit 244 obtains the light ray vectors VL2 indicating the directions of light on the XY-plane on the basis of the XY components in the position coordinate set for the light source L. Further, for example, the normal vector correction unit 244 obtains the eyes vector VE, for example, by subtracting the XY components of a pixel to be processed from the XY components of the image center Ob of the normal vector image 742. Then, the normal vector correction unit 244 converts each of the normal vectors VN, the light ray vectors VL2 and the ray vectors VE to a unit vector severally, and synthesizes the converted unit vectors. Furthermore, the normal vector correction unit 244 converts the synthesize vector to a unit vector.

The finally obtained XY two-dimensional vector is called as an intense normal vector VI. An image having the X values and the Y values of the two-dimensional vector components of the intense normal vectors VI as the R values and the G values of pixels, respectively, is called as an intense normal vector image 744. In the generation of the intense normal vector image 744, because of the similar reason to that at the generation of the above-mentioned normal vector image 742, the B values of the color information of the pixels are not set to be the operation object. Consequently, the image generation operation unit 24 can perform the synthesis of vectors, their conversion to unit vectors or the like easily.

The retouch operation unit 246 refers to the intense normal vector image 744 obtained by the normal vector correction unit 244, and generates the highlight retouched image 746 and the shadow retouched image 747 by rendering the brush image 734 on the basis of the intense normal vectors VI.

FIGS. 8A, 8B, 8C, 8D, 8E and 8F are views for illustrating the concept of the generation of the retouched image in the present embodiment. In the present embodiment, the brush images 734 are rendered by making the directions of the brush images 734 coincide with the directions of the intense normal vectors VI.

Figure 8A:
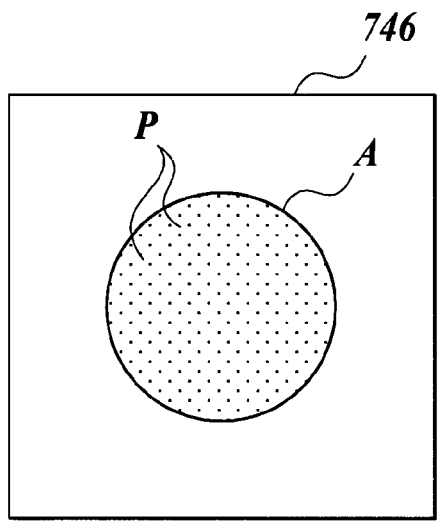
FIGS. 8A, 8B, 8C, 8D, 8E and 8F are views for explaining the concept of generation of a high light retouched image 746.
Figure 8B:
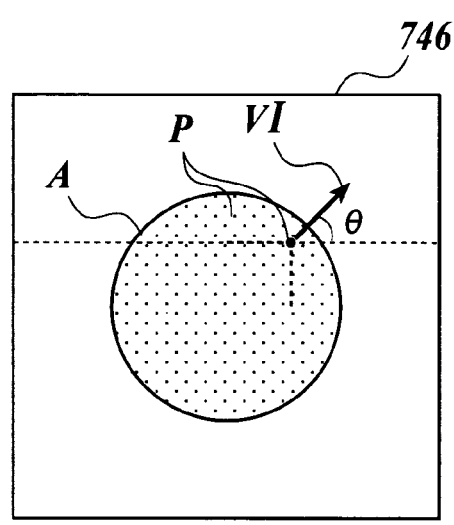

To put it more concretely, as shown in FIG. 8A, the retouch operation unit 246 sets the coordinates of a predetermined number of sampling points P on the screen coordinate. As the setting method of the sampling points P, the sampling points P may be randomly set, or may be set along a predetermined grid. Then, as shown in FIG. 8B, by referring to the R value and the G value of the color information of the position of each sampling point P, the retouch operation unit 246 obtains the intense normal vector VI on the basis of the intense normal vector image 744, and obtains the intersection angle θ with the X-axis.

Figure 8C:
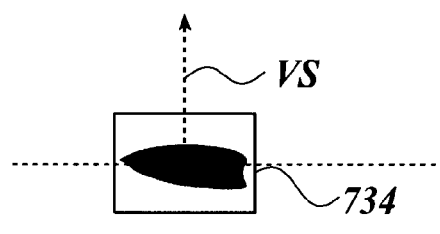
Figure 8D:
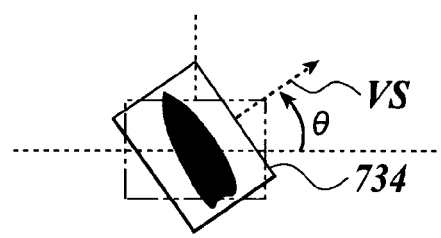
Figure 8E:
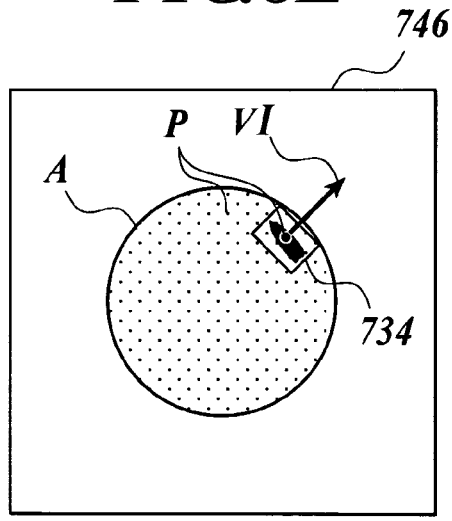
Figure 8F:
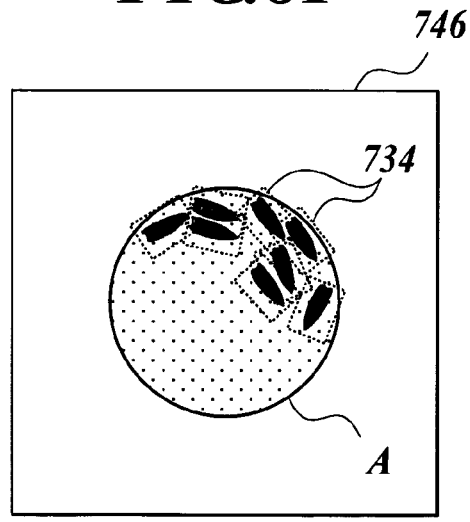

As shown in FIG. 8C, the brush image 734 is a gray scale image exhibiting a shape colored with the tip of a brush and light and shade of the coloring by means of brightness. Each brush image 734 severally includes a brush direction VS as a standard. Then, as shown in FIG. 8D, the retouch operation unit 246 clockwise rotates the brush image 734 by the intersection angle (90°−θ) so as to make the brush direction VS (a two-dimensional vector composed of an X-direction component and a Y-direction component) coincide with the direction of the intense normal vector VI. Then, the retouch operation unit 246 renders the rotated brush image 734 at the sampling point P of the retouched image 746 (FIG. 8E).

The rendering colors at rendering are determined according to the gray scale values at the positions of the sampling points P of the shaded image 740. By rendering the brush images 734 to many sampling points P, it is possible to obtain an image the touch of which was formed as if a brush is added many times.

As described above, in the present embodiment, the retouched image includes the highlight retouched image 746 for expressing a highlight and the shadow retouched image 747 for expressing a shadow, according to the object. Therefore, when the retouched image 746 is synthesized with the paint image 749 according to a suitable synthesis method, it is possible to express a suitable touch in the paint image 749.

The image synthesis unit 26 synthesizes images generated by the image generation operation unit 24 according to operation processing, and stores the game image in the buffer. The method for synthesizing images can be realized according to a well-known method. The image synthesis unit 26 can select any synthesis method suitably. The image synthesis unit 26 can be realized by LSI hardware such as a DSP or the like, a frame buffer, or the like. Further, the image synthesis unit 26 can be realized by making a CPU execute a predetermined image processing program.

The sound generation unit 28 generates sounds such as game sounds, effect sounds, BGM or the like, and controls the sound output unit 40 to output the sounds. The sound generation unit 28 can be realized by, for example, LSI hardware such as a DSP or the like. Further, the sound generation unit 28 can be realized by making a CPU execute a predetermined sound generation program.

The image display unit 30 is a section capable of displaying the frame image generated by the image synthesis unit 26. The image display unit 30 is implemented by, for example, an image display device such as a CRT, an LCD, a PDP, an ELD or the like, and a driver. In FIG. 1, the display 1302 corresponds to the image display unit 30.

The sound output unit 40 outputs sounds such as effect sounds, BGM or the like on the basis of sound signals generated by the sound generation unit 28. In FIG. 1, the speakers 1304 correspond to the sound output unit 40.

The storage unit 70 is a section for storing programs or various pieces of data which are necessary for the execution of operation processing performed by the processing unit 20. The storage unit 70 is implemented by, for example, various IC memories, a hard disk, an MO, a DVD, a CD-ROM or the like. In FIG. 1, the IC memory 1322 corresponds to the storage unit 70.

The storage unit 70 stores game information 72 for storing programs and data for executing a game in the embodiment.

As the program included in the game information 72, the storage unit 70 stores a game operation program 720 for making the processing unit 20 function as the game operation unit 22, an image generation program 722 for making the processing unit 20 function as the image generation operation unit 24, and an image synthesis program 728 for making the processing unit 20 function as the image synthesis unit 26.

A normal vector correction program 724 for making the processing unit 20 function as the normal vector correction unit 244 and a retouch operation program 726 for making the processing unit 20 function as the retouch operation unit 246 are included in the image generation program 722.

As setting data included in the game information 72, the storage unit 70 stores object data 710, a lighting setting 730, a virtual viewpoint setting 732, a brush image 734 and record information 736.

Modeling data 712 for storing three-dimensional data of modeling of objects, color information of objects or the like, sampling setting information 714 for storing information for setting sampling points P which are positions of touches added to the object, retouch setting information 716 for setting information on a method for rendering brush images at the sampling points P, and a synthesis condition setting 718 for setting information on a method for synthesizing various images generated by the image generation operation unit 24, are included in the object data 710. The object data 710 are predetermined to each of objects appearing in the game.

FIG. 4 is a view showing an example of the data structure of the sampling setting information 714.

An object ID 714*a* is identification information on the sampling setting information 714. The object ID 714*a* stores, for example, a name of an object and a file name.

A sampling image 714*b* specifies image data for obtaining information of the vector indicating the direction of the object surface in the XY-plane of the screen coordinates at the time of rendering the brush image 734. In the present embodiment, because the brush images 734 are rendered on the direction of the intense normal vectors VI, the intense normal vector image 744 is the default. However, the normal vector image 742 can be appropriately set.

The sampling type 714c sets the method for arranging the sampling points P. In the present embodiment, a grid type arrangement method for setting the sampling points P in a grid state and a random type arrangement method for setting the sampling points P in a random state can be selected. The total number of the sampling points P to be set is stored in a sampling number 714g.

Figure 9A:
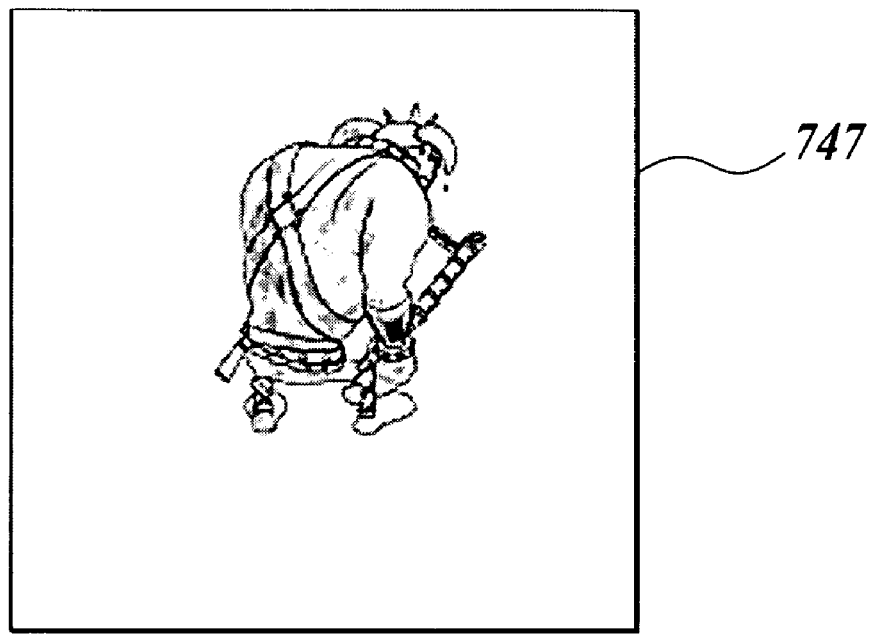
FIGS. 9A and 9B are views showing examples of shadow retouched images 747 having different sampling types.
Figure 9B:
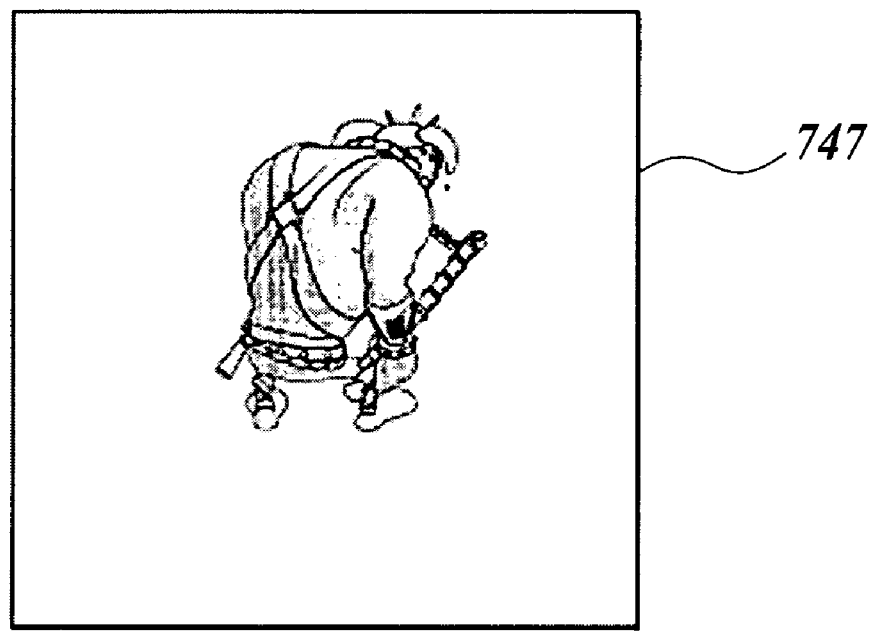

FIGS. 9A and 9B are views showing examples of the shadow retouched images 747 having different sampling types. Incidentally, edges are added to the retouched images 746 for the sake of convenience. FIG. 9A shows the shadow retouched image 747 according to the random type arrangement method, and touches are irregularly rendered. On the other hand, FIG. 9B shows the shadow retouched image 747 according to the grid type arrangement method, and touches are regularly rendered. The grid type arrangement method is effective in making the impression of a canvas-like comparatively regular texture painting material.

When the sampling type 714c of FIG. 4 is set to the random type, it is possible to set the scope in which the sampling points P are set by means of a random pattern 714d.

FIGS. 10A and 10B are conceptual diagrams for illustrating the random patterns 714d in the present embodiment. As shown in FIGS. 10A and 10B, for example in the grid type of FIG. 10A, the sampling points P are set in a grid state. In the random type I of FIG. 10B, the sampling points P are randomly set in the whole screen coordinates. In the random type II of FIG. 10B, the sampling points P are randomly set only in the part in which the object A is rendered of the screen coordinates. The part in which the object A is rendered is discriminated, for example, referring to the α value of the normal vector image 742. In the random type III of FIG. 10B, the sampling points P are randomly set only in the part in which the object A is rendered of the screen coordinates. Further, in the random type III, with reference to the brightness values at the positions of the sampling points P on the basis of the shaded image 740 (iso-brightness curves are displayed as broken lines as standard), the sampling points P having brightness values meeting a predetermined condition (for example, larger or smaller than the threshold value of sampling brightness 733, or the like) are made to be effective. In the random type IV in FIG. 10B, with reference to the brightness values at the positions of the sampling points P of the shaded image 740 previously, all of the sampling points P are set in the scope in which the brightness values meet the predetermined condition.

A sampling curve 714e in FIG. 4 sets the types of sampling functions (filters) to be used at the time of the referring to the brightness of the shaded image 740 in the random types III and IV of the random pattern 714d.

FIGS. 11A, 11B, 11C and 11D are views for illustrating the concept of the sampling functions set by the sampling curve 714e. The sampling functions receive the brightness read out of the shaded image 740 as their input, and outputs values calculated in accordance with predetermined functions.

Figure 11A:
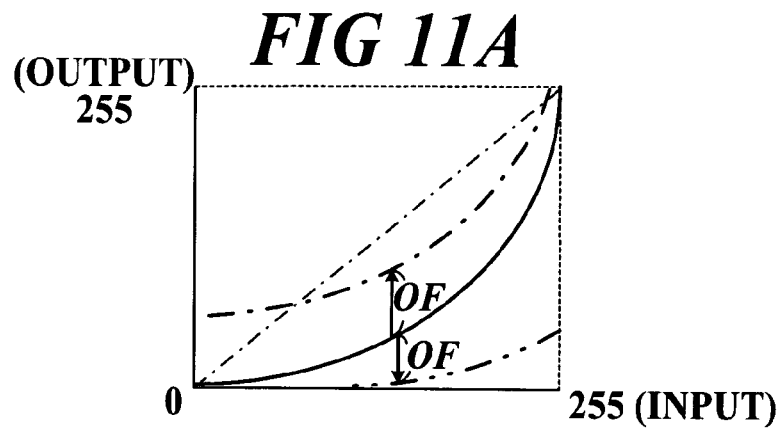
FIGS. 11A, 11B, 11C, and 11D are views for explaining the concept of sampling functions set by sampling curves.
Figure 11B:
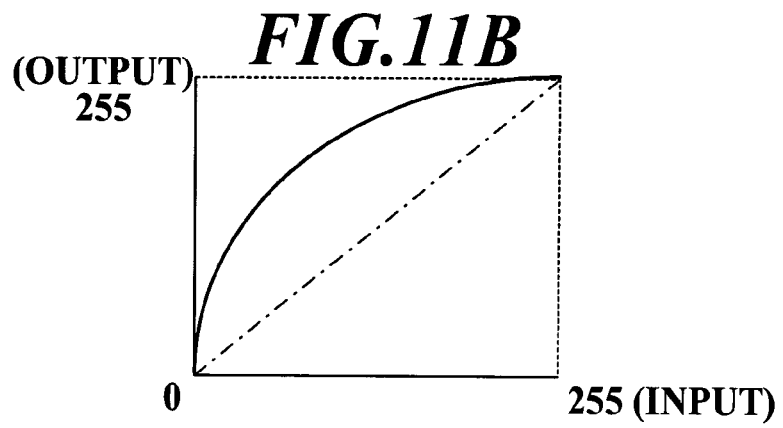
Figure 11C:
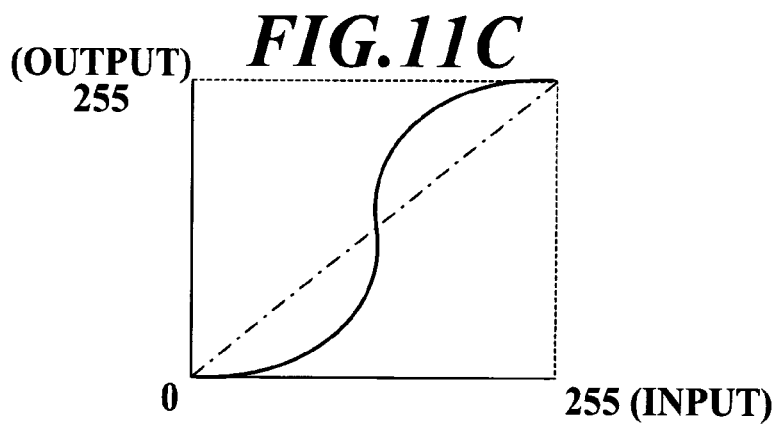
Figure 11D:
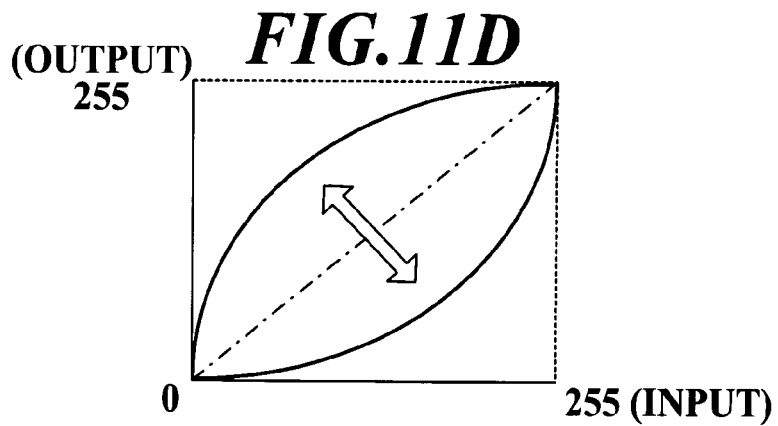

In FIG. 11A, the values of the brightness capable of being obtained from the shaded image 740 are output to be lower. Consequently, the sampling points P are set also in comparatively bright positions of the shaded image 740, and touches are added to such positions also. In FIG. 11B, the values of the brightness is output to be higher on the contrary. Consequently, the sampling points P are set in comparatively dark positions of the shaded image 740, and touches are added to such positions. In addition, the sampling function may be set as in FIGS. 11C and 11D. FIG. 11D shows the setting in which the characteristic of the function further randomly varies.

In order to determine the sampling point on the basis of the brightness of the shaded image 740 in the random types III and IV of the random pattern 714d, the sampling point is determined on the basis of the output values of the sampling function.

In the present embodiment, a plurality of sampling functions which can be set by the sampling curve 714e are previously prepared. Therefore, any one of the plurality of sampling functions is suitably selected according to the characteristic of the object or the environmental condition (for example, an image of a character, the light state of the environment in which the character enters, or the like).

A sampling curve offset quantity 714f sets offset quantity OF of the sampling function (see FIG. 11A). For example, in case of the offset in the plus direction, the brightness of the shaded image 740 equal to certain brightness or more, or equal to certain brightness or less is output as "0".

Figure 12A:
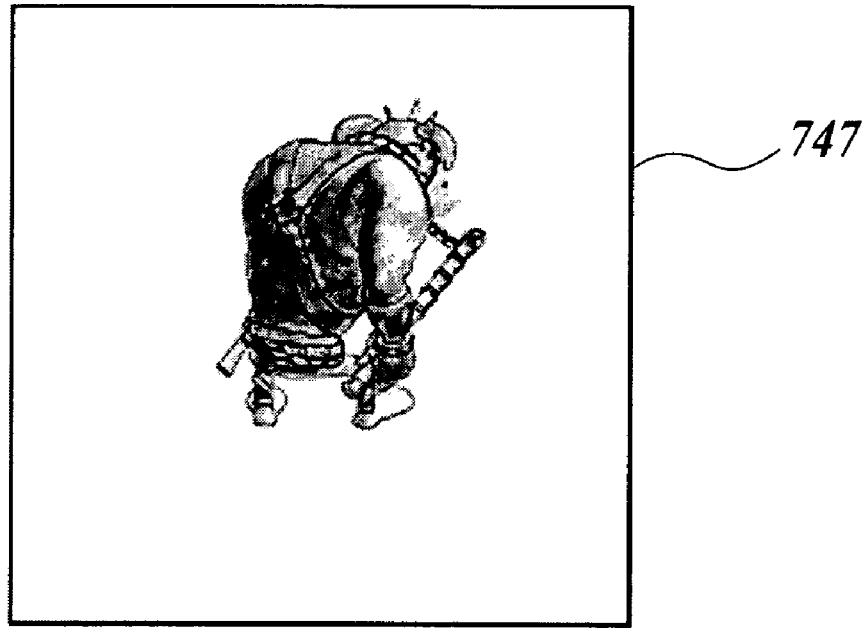
FIGS. 12A and 12B are views showing examples of shadow retouched images 747 which are based on the same shaded image and have different offset quantities of the sampling curves.
Figure 12B:
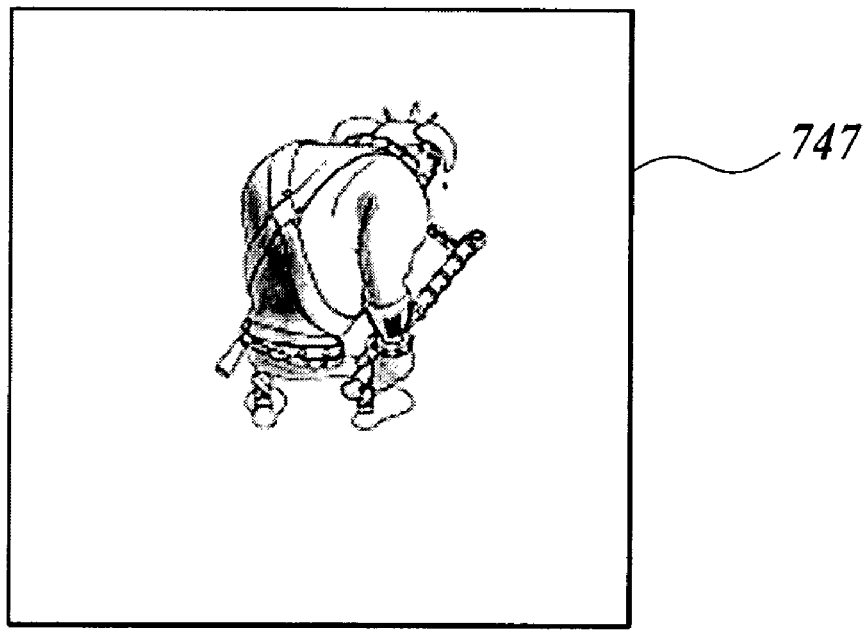

FIGS. 12A and 12B are views showing examples of the shadow retouched images 747 which are based on the same shaded image 740 and have different sampling curve offset quantity 714f. Incidentally, edges are added to the retouched images 746 for the sake of convenience. FIG. 12A shows the case where the offset quantity is zero, and FIG. 12B shows the case where the offset quantity is three. In the case of FIG. 12B, values relatively higher than input values are output owing to the offset in the plus direction. Consequently, by determining whether the sampling points P are set on the basis of the same brightness as a boundary value, a bright tone of handwriting style NPR image having increased touches can be generated.

FIG. 5 shows a view showing an example of the data structure of the retouch setting information 716 in the present embodiment. The retouch setting information 716 is set for every retouched image to be generated. In the present embodiment, the retouch setting information 716 is set for the highlight retouched image 746 and the shadow retouched image 747.

An object ID 716a is identification information of the sampling setting information 714. The object ID 716a stores, for example, a name of the object or a file name.

The using brush 716b specifies the brush image 734 to be rendered as a touch.

A brush size 716c sets a scaling ratio at the time of rendering the brush image 734.

A brush roll 716d sets the offset value of rotation quantity of the brush image 734 when the retouch operation unit 246 adjusts the direction of the brush image 734 to the direction of the intense normal vector VI (or the normal vector VN in case of some setting of the sampling image 714b).

Figure 13A:
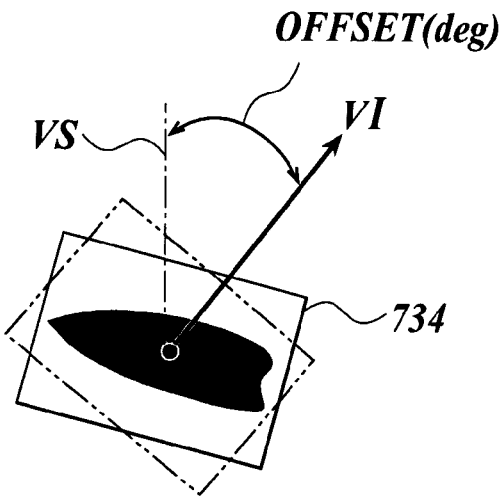
FIGS. 13A, 13B and 13C are views for explaining the concept of a brush roll.
Figure 13B:
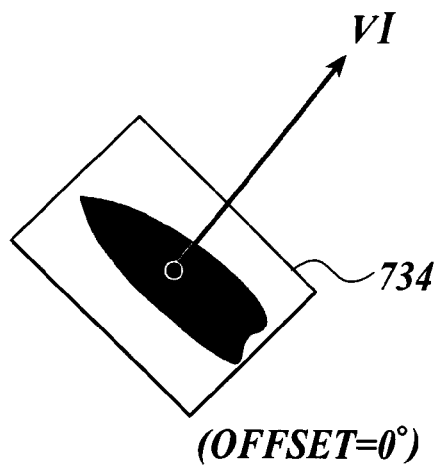
Figure 13C:
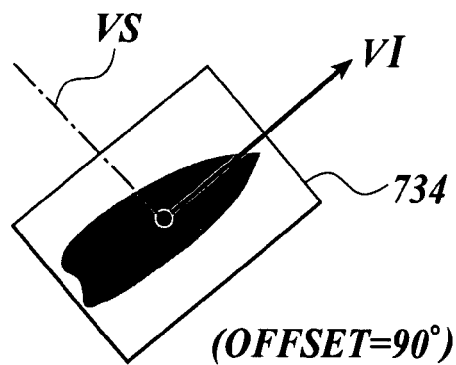

FIGS. 13A, 13B and 13C are views for illustrating the concept of the brush roll 716d. As shown in FIG. 13A, the brush direction VS of the brush image 734 is shifted from the direction of the intense normal vector VI by the offset quantity. By setting the brush roll 716d adequately, it is possible to give a plurality of touch expressions such as the state of using a flat brush vertically (FIG. 13B), the state of using the flat brush horizontally (FIG. 13C) or the like.

A brush repeat number 716e in FIG. 5 sets the number of times of rendering the brush images 734 to one sampling point P. At that time, the degree of shifting each brush image 734 for rendering it is determined in order that the brush repeat number 716e may be included within the scope set by a brush movement range 716f, and then the rendering position coordinates of each brush image 734 are suitably increased or decreased. In case of FIG. 5, the brush images 734 are rendered at rendering positions changed so as to render the brush image 734 three times and place a part of one of the brush images 734 upon another brush image 734, within the scope of 15 pixels in the direction of the intense normal vector VI from the position coordinates of one sampling point P as a starting point.

Figure 14:
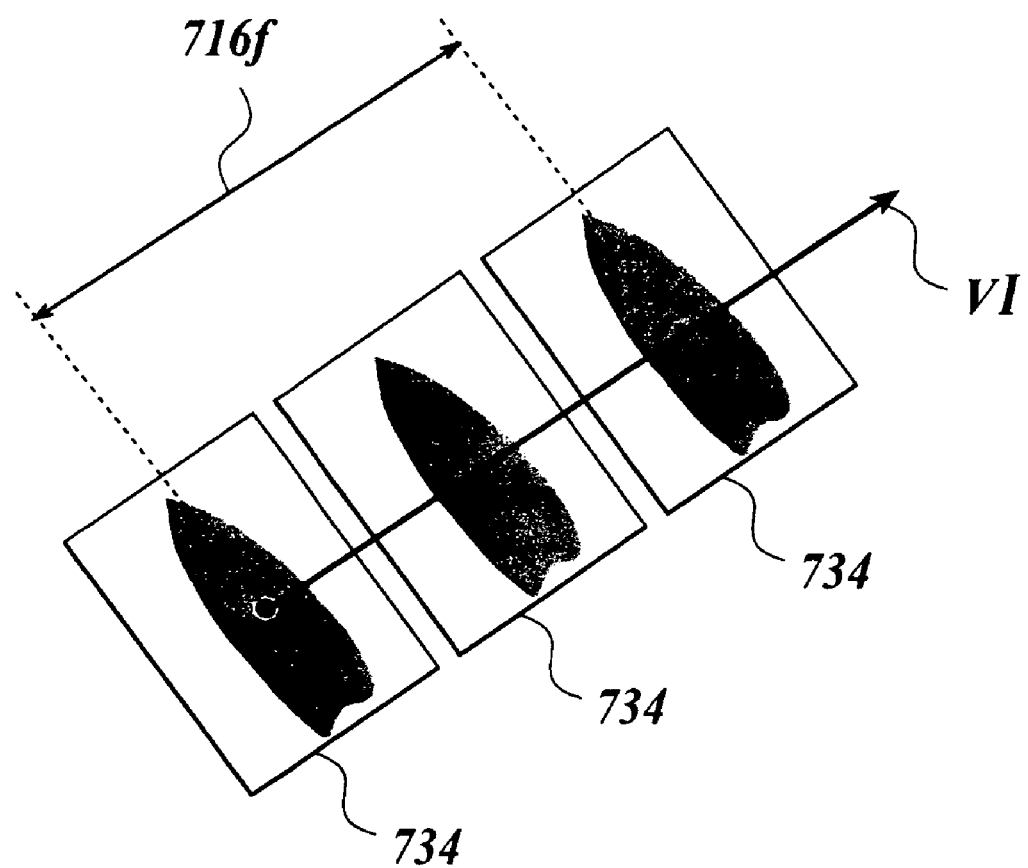
FIG. 14 is a view for explaining the concept of brush repeating.
Figure 15A:
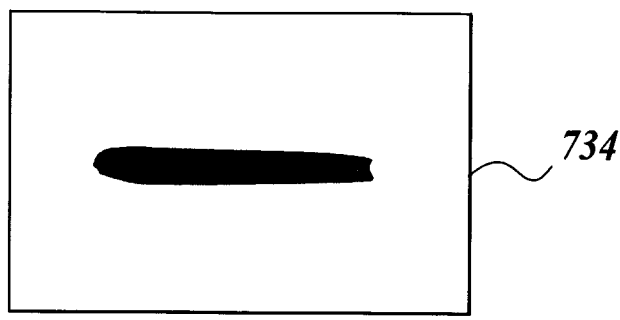
FIGS. 15A, 15B, 15C and 15D are views showing examples of brush images 734.
Figure 15B:
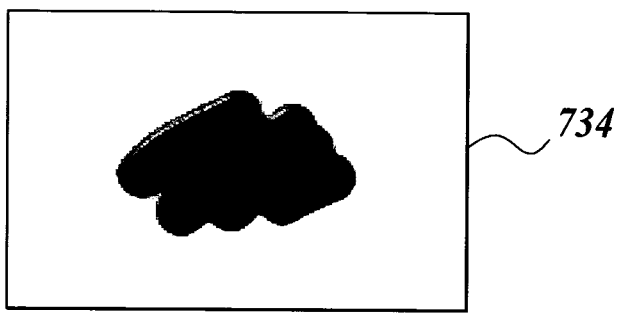
Figure 15C:
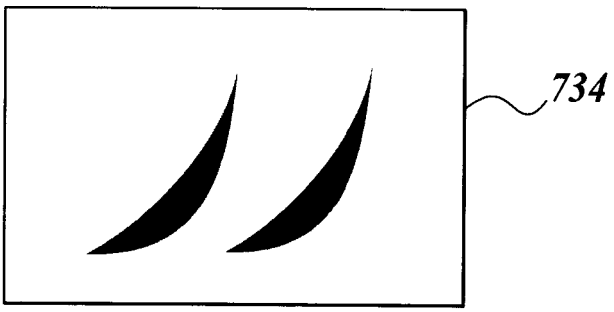
Figure 15D:
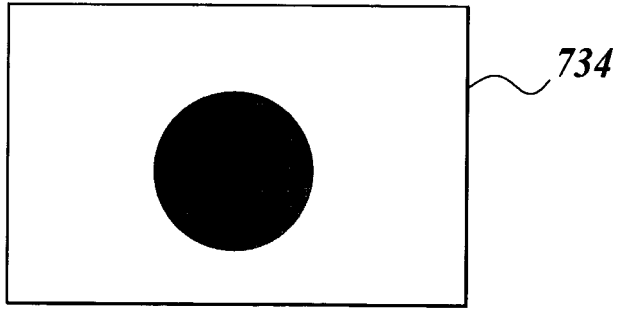

FIG. 14 is a view for illustrating the concept of the brush repeating. As shown in FIG. 14, the brush images 734 are rendered in order that a part of one of the brush images 734 may be placed upon another brush image 734 to one sampling point P. Because the plurality of brush images 734 can be rendered at a time, the processing can be performed at high speed, and further sufficient touches can be expressed without setting the sampling number 714g to be so large.

In the present embodiment, the relative position at which the brush image 734 is rendered to the sampling point P can be randomly changed (shifted) as time passes by means of a random setting method 716g, a position offset range 716h, a position offset variation 716j and a rotation offset range 716k in FIG. 5.

The random setting method 716g sets a condition of using a random number generation function continuously. For example, in the present embodiment, the random setting method 716g can set "Every Mode" for using the different random number generation function every when generating the retouched image, "Frame Mode" for using the same random number generation function in the same frame, and "Scene Mode" for using the same random number generation function for one scene. Incidentally, the frame number or the scene number necessary hereupon is suitably counted in record information 736.

The position offset range 716h specifies an offset scope common to both of the X-axis and the Y-axis of the position at which the brush image 734 is rendered to the sampling point P. In case of FIG. 5, the brush image 734 is rendered at the position offset within the scope of plus five pixels and minus five pixels from the sampling point P in both of the X-axis direction and the Y-axis direction. The position offset variation 716j further sets an offset value for every frame.

The rotation offset range 716k specifies an offset scope of the relative angle of the brush image 734 to the sampling point P. That is, the rotation offset range 716k provides random variations to the brush roll 716d.

Consequently, because the position at which the brush image 734 is rendered is changed slightly for every frame, it is possible to express the image so that a viewer feels that a shift or fluctuation of the rendering position is caused owing to handwriting.

Consequently, when the position offset range 716h, the position offset variation 716j and the rotation offset range 716k are set to be large, the difference between frames in positions of touches becomes larger. Thereby, it is possible to produce handwriting style touches which can make powerful and rough-planed impression. Conversely, when their values are set to be small, the difference between frames in positions of touches becomes smaller. Thereby, it is possible to produce touches which can make smooth and fine impression.

Further, in the present embodiment, the color information for rendering the brush image 734 can be set.

A color sampling material 716m specifies image data used for determining light and shade of the brush image 734 when rendering the brush image 734 at the sampling point P. In the present embodiment, "NONE" which specifies the shaded image 740 as the sampling material is the default. However, for example, when image data of a predetermined texture of paper or sheet are specified as the sampling material, it is also possible to provide rub impression for the handwriting style touch.

A color sampling curve 716n sets a sampling function for changing color information obtained from the image data specified by the color sampling material 716m. For example, the obtained color information is corrected in accordance with a predetermined function, and thereby the light and shade are emphasized, equalized or the like. The sampling function has characteristics similar to those shown in FIGS. 11A-11D.

A curve offset 716p sets the offset value of the sampling function set by the color sampling curve 716n.

A brush color 716r sets specific color information to be given to the brush image 734. The brush color 716r sets black as the default. However, when the brush color 716r sets, for example, red, a touch in red can be added.

A color number 716s sets color gradation of the brush image 734. That is, the color information obtained by the sampling function set by the color sampling curve 716n is further converted to specified color gradation.

The synthesis condition setting 718 sets the synthesis method to each of the paint image 749, the highlight retouched image 746, the shadow retouched image 747 and the edge image 748.

For example, because the highlight retouched image 746 is a gray scale image that is a light color is rendered at a part to which highlight touches are added and a dark color is rendered at a part to which highlight touches are not added, when the highlight retouched image 746 is screen-synthesized with the paint image 749, the original color (basic color) of the paint image 749 is shifted to only the part at which the light color is rendered. Consequently, it is possible to synthesize the light highlight touches with leaving the tone of the basic color.

Further, because the shadow retouched image 747 is a gray scale image that is a dark color is rendered at a part to which shadow touches are added and a light color is rendered at a part to which shadow touched are not added, when the shadow retouched image 747 is multiplication-synthesized with the paint image 749, the basic color of the paint image 749 is left at the part at which the light color is rendered, and the brightness of the part at which the dark color is rendered is lowered. Consequently, it is possible to synthesize the dark shadow touches with leaving the tone of the basic color. The edge image 748 is also set as described above.

The lighting setting 730 stores set information of the light source to be arranged in the virtual space.

The virtual viewpoint setting 732 stores set information of a virtual viewpoint C in the virtual space such as the position, the rotation angle, the angle of view or the like of the virtual viewpoint C.

The brush image 734 is a gray scale image corresponding to a colored brightness pattern which is formed by placing a painting material such as a paintbrush, a pen or the like on a sheet of paper. FIGS. 15A, 15B, 15C and 15D are views showing examples of the brush images 734. Patters capable of realizing desired touches are previously prepared as the brush images 734. Further, the sizes of the images are also appropriately set according to the desired touches such as 64×64 pixels, 128×128 pixels or the like.

As image data, the storage unit 70 stores the shaded image 740, the normal vector image 742, the intense normal vector image 744, the highlight retouched image 746, the shadow retouched image 747, the edge image 748, the paint image 749, and an object synthesis image 752 generated by synthesizing the highlight retouched image 746, the shadow retouched image 747 and the edge image 748 with the paint image 749.

A part of the storage unit 70 functions as a rendering frame buffer, and stores a frame image 750 in the rendering frame buffer.

Description of Processing

Next, the flow of processing in the present embodiment will be explained with reference to FIGS. 16-19. Hereupon, the processing regarding the game operation is supposed to be performed similarly to conventional processing, and the description of the processing is omitted. Then, the processing for generating an image, synthesizing the image and then displaying the image is described on the basis of the operation results (geometry operation results) of the game operation unit 22.

Figure 16:
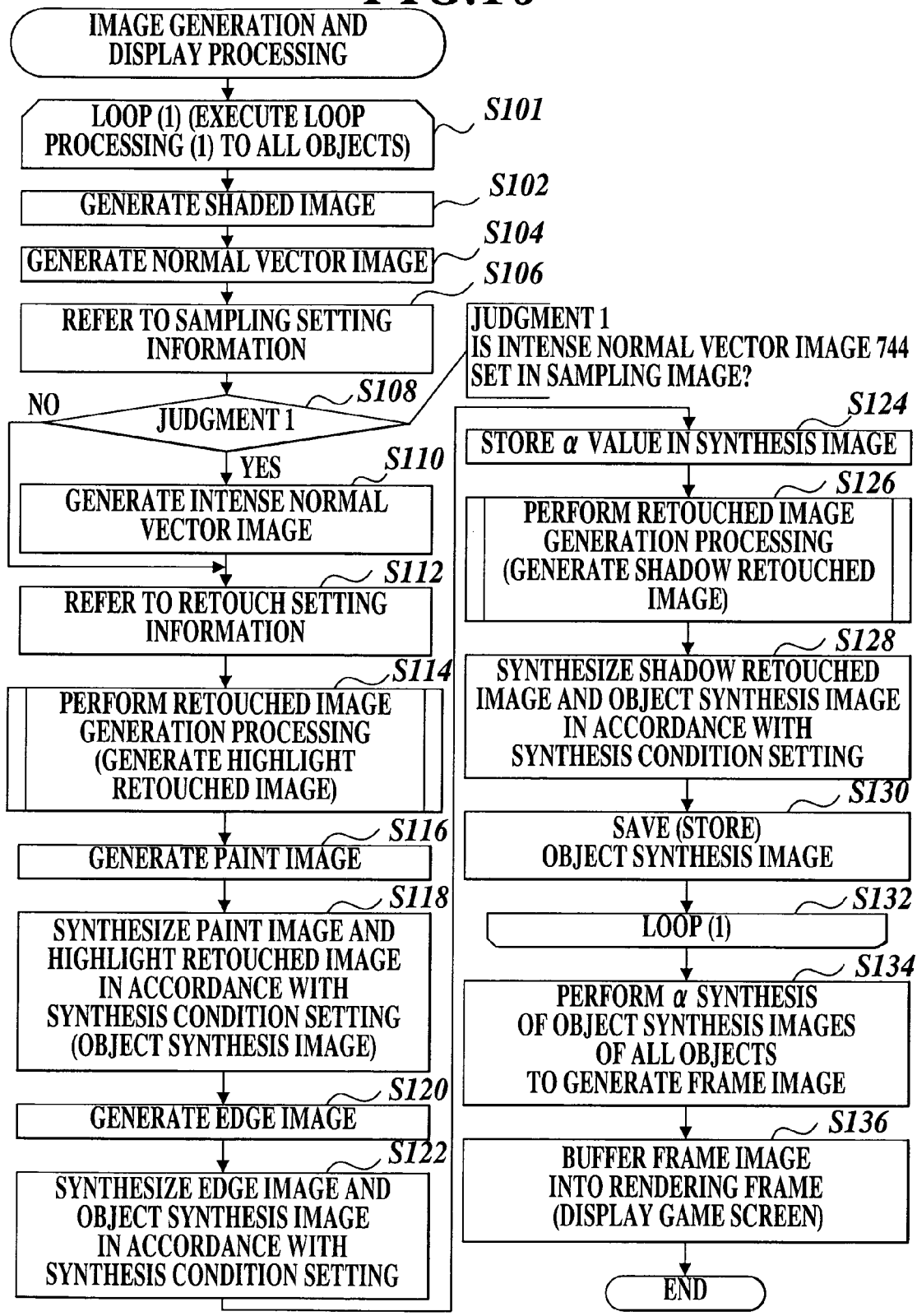
FIG. 16 is a flowchart for explaining the flow of image generation and display processing.

FIG. 16 is a flowchart for illustrating the flow of the image generation and display processing in the present embodiment. As shown in FIG. 16, the image generation operation unit 24 executes loop processing (1) for generating the object synthesis image being the NPR image including the handwriting style touch as to the objects to be rendered on the game screen (Step S101).

In the loop processing (1), the image generation operation unit 24 first generates the shaded image 740 (Step S102), and then generates the normal vector image 742 (Step S104).

Next, the normal vector correction unit 244 refers to the sampling setting information (Step S106). When the intense normal vector image 744 is set in the sampling image 714b (Yes at Step S108), the normal vector correction unit 244 obtains the intense normal vector image 744 on the basis of the normal vector image 742 (Step S110). To put it more concretely, the normal vector VN is obtained from the normal vector image 742. The normal vector VN is the normal vector indicating the direction of a polygon surface constituting the object when the polygon surface is projected onto the XY-plane of the screen coordinates. The game apparatus 1300 corrects the normal vector VN on the basis of the direction of the light ray and the direction of the eyes line to set the corrected normal vector VN to be the intense normal vector VI. The vector values of the intense normal vector VI are stored as the RGB values being the color information of a pixel of the intense normal vector image 744.

Next, the retouch operation unit 246 refers to the retouch setting information 716 (Step S112), and then executes retouched image generation processing for generating the highlight retouched image (Step S114).

Figure 17:
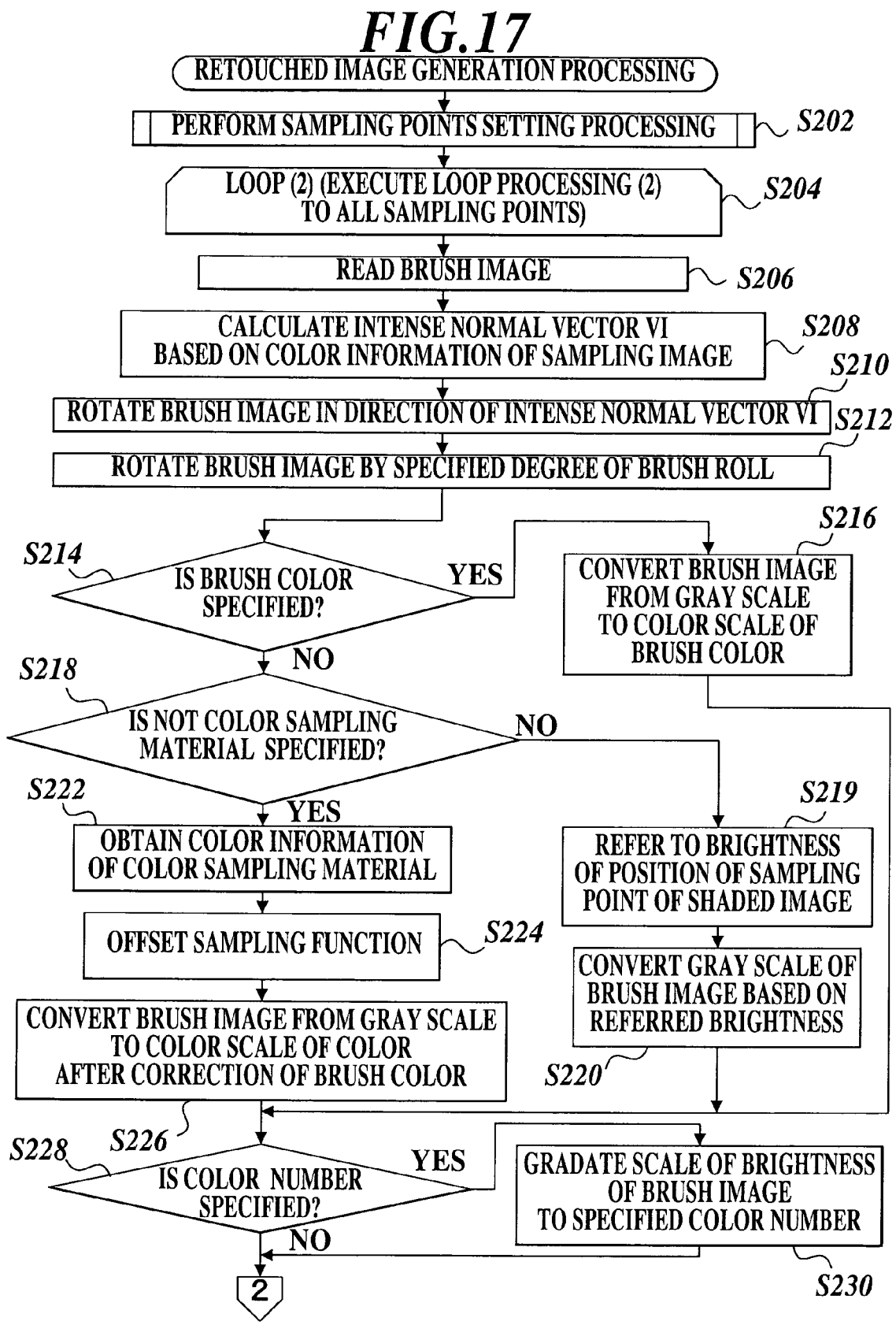
FIG. 17 is a flowchart for explaining the flow of retouched image generation processing.
Figure 18:
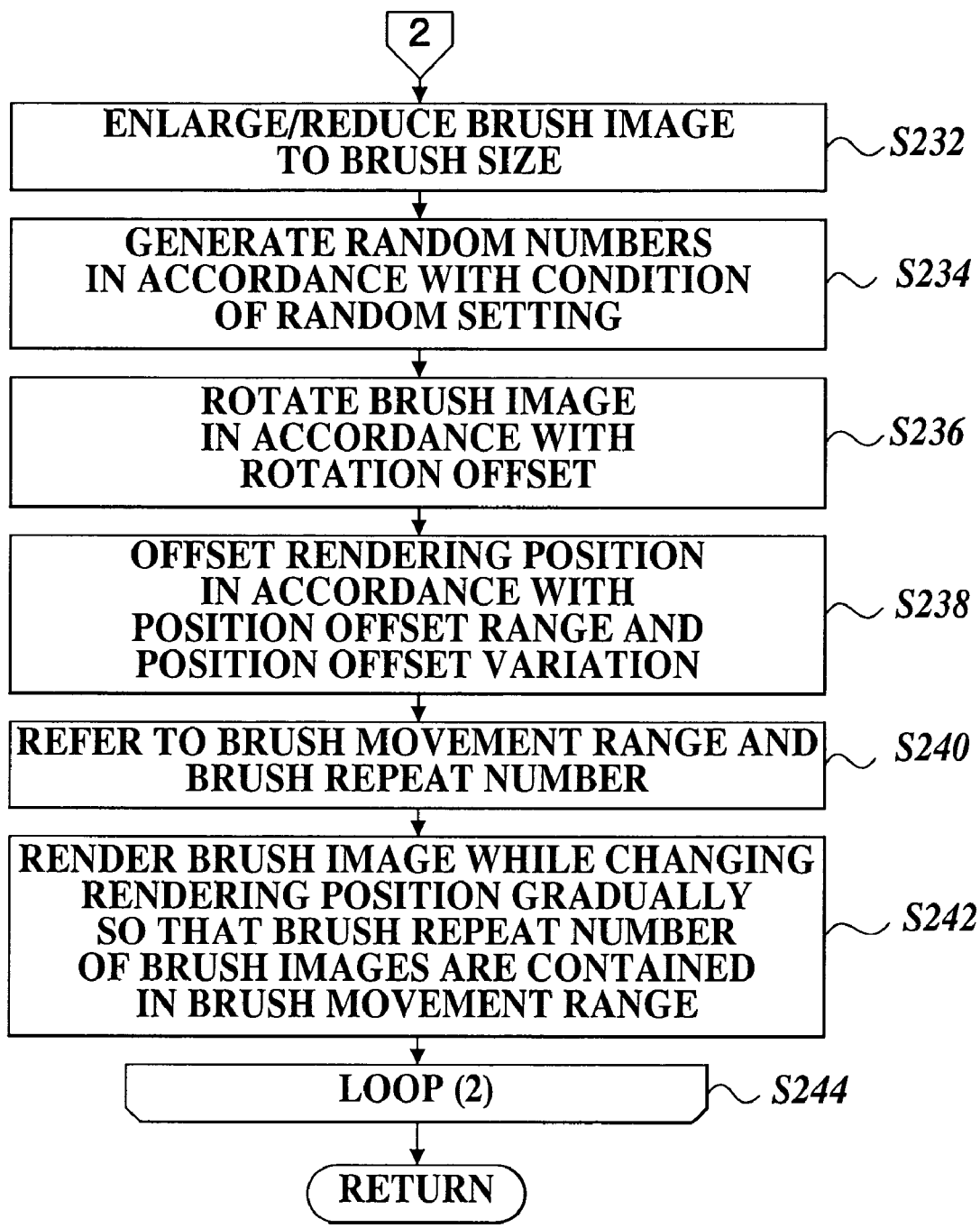
FIG. 18 is a flowchart for explaining the flow of the retouched image generation processing.

FIGS. 17 and 18 are flowcharts for illustrating the flow of the retouched image generation processing of the present embodiment.

First, the retouch operation unit 246 determines sampling points P corresponding to positions at which touches are added.

The retouch operation unit 246 referred to the sampling setting information 714, and executes sampling points setting processing to set the sampling points P on the screen coordinates (Step S202). The position coordinates of the sampling points P are stored in the storage unit 70.

Figure 19:
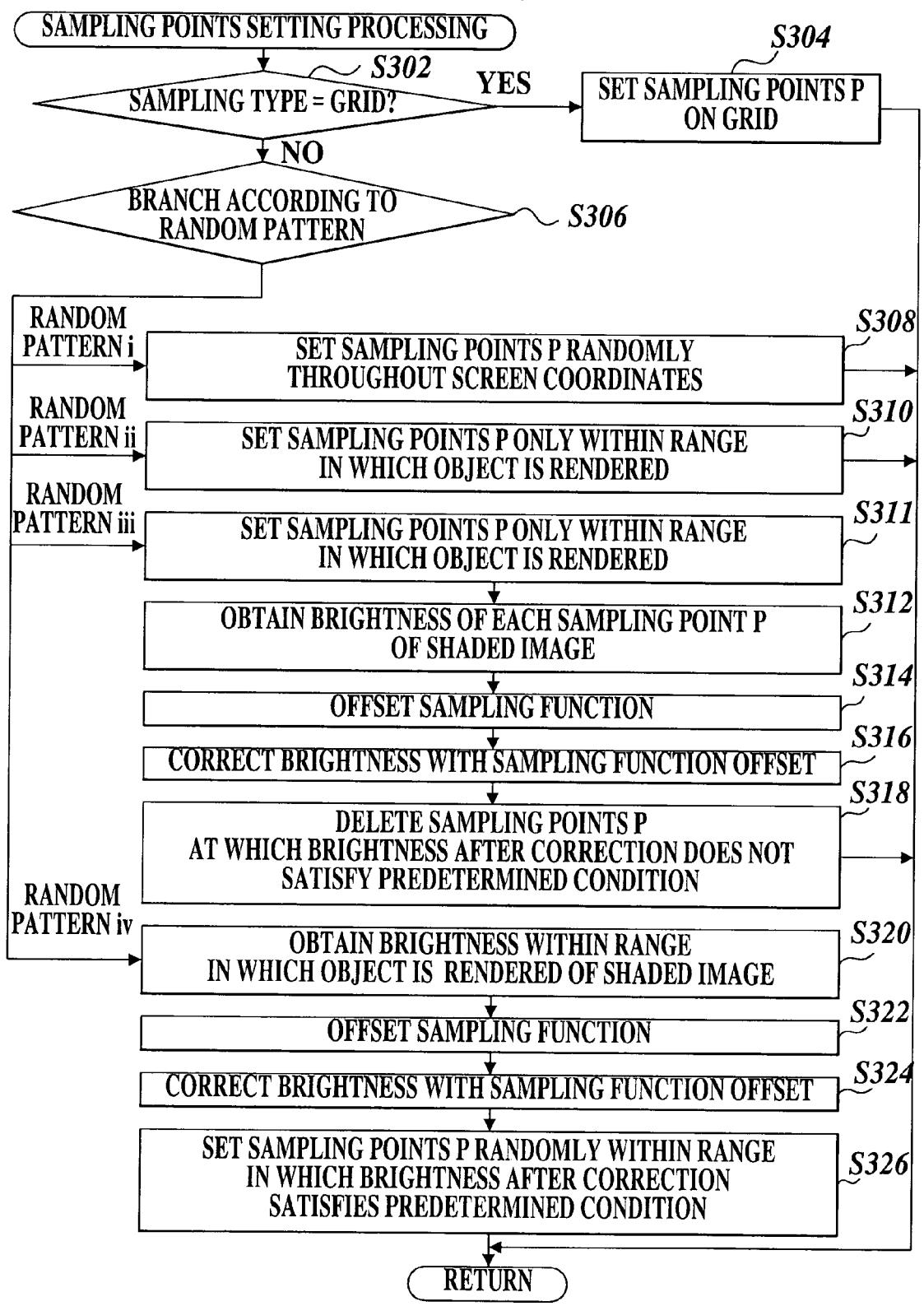
FIG. 19 is a flowchart for explaining the flow of sampling points setting processing.

FIG. 19 is a flowchart for illustrating the sampling points setting processing in the present embodiment. As shown in FIG. 19, when the sampling type 714c is specified to be "grid" (Yes at Step S302), the retouch operation unit 246 sets the sampling number 714g of sampling points P on a predetermined grid in the screen coordinates (Step S304).

When the sampling type 714c is specified to be "random" (No at Step S302), the retouch operation unit 246 further refers to the random pattern 714d (Step S306).

When the random pattern 714d is the random pattern I, the retouch operation unit 246 randomly sets the sampling points P throughout the screen coordinates in accordance with conditions (Step S308).

When the random pattern 714d is the random pattern II, the retouch operation unit 246 sets the sampling points P only within the range in which the object is rendered (Step S310). The range is determined with reference to, for example, the α value of the intense normal vector VI.

When the random pattern 714d is the random pattern III, the retouch operation unit 246 sets the sampling points P only within the range in which the object is rendered (Step S311), and obtains the brightness of the shaded image 740 at each of the sampling points P (Step S312). Then, the retouch operation unit 246 offsets the sampling function specified by the sampling curve 714e in accordance with the sampling curve offset quantity 714f (Step S314), and corrects the brightness obtained from the shaded image 740 in accordance with the offset sampling function (Step S316). Then, the retouch operation unit 246 deletes the sampling points P having the corrected brightness which does not satisfy the predetermined condition (for example, being larger or smaller than the threshold value of brightness, or the like) (Step S318).

When the random pattern 714d is the random pattern IV, the retouch operation unit 246 obtains the brightness within the range in which the object is rendered is obtained of the shaded image 740(Step S320), offsets the sampling function specified by the sampling curve 714e in accordance with the sampling curve offset quantity 714f (Step S322), and corrects the brightness obtained from the shaded image 740 in accordance with the offset sampling function (Step S324). Therefore, the retouch operation unit 246 sets the sampling points P within the range in which the corrected brightness satisfies the predetermined condition (Step S326).

After the retouch operation unit 246 sets the sampling points P, the retouch operation unit 246 finishes the sampling points setting processing and returns to the flow of FIG. 17.

In FIG. 17, the retouch operation unit 246 executes the following loop processing (2) to all of the sampling points P set by the sampling points setting processing (Step S204).

In the loop processing (2), the retouch operation unit 246 first prepares the brush image 734 for rendering touches. The retouch operation unit 246 refers to the using brush 716b, and reads the brush image 734 (Step S206). Next, the retouch operation unit 246 refers to the image specified by the sampling image 714b (the intense normal vector image in this case), reads the color information at the position of the sampling point P, and calculates the intense normal vector VI (Step S208).

After obtaining the intense normal vector VI, the retouch operation unit 246 rotates the brush image 734 in order that the brush direction VS may coincide with the intense normal vector VI (Step S210). At the time of the rotation, the retouch operation unit 246 rotates the brush image 734 by the rotation quantity of the brush roll 716d (Step S212). Therefore, the basic brush direction has been determined.

Next, the color (rendering color) for rendering the brush image 734 will be determined.

When the brush color 716r is specified (Yes at Step S214), the retouch operation unit 246 converts the gray scale of the brush image 734 to the color scale of the brush color 716r (Step S216). For example, when yellow is specified by the brush color 716r, the brush image 734 becomes the color scale based on the light and shade of the specified yellow. When the brush image 734 having the converted color scale is rendered, the touch becomes the yellowish light and shade.

When the brush color 716r is not specified (No at Step S214) and the color sampling material 716m is not specified ("NONE") (NO at Step S418), the retouch operation unit 246 refers to the brightness of the shaded image 740 at the position of the sampling point P (Step S219), and converts the gray scale of the brush image 734 on the basis of the referred brightness (Step S220). That is, although the brush image 734 remains as the gray scale image, the brush image 734 is shifted to the gray scale according to the brightness of the shaded image 740 at the position of the sampling point P. When the brush image 734 having the converted brightness is rendered, the touch becomes the light and shade according to the shaded image 740.

When the color sampling material 716m species a specific image (YES at Step S218), the retouch operation unit 246 obtains the color information of the specified image at the point of the sampling point P (Step S222), and offsets the sampling function specified by the color sampling curve 716n in accordance with the curve offset 716p (Step S224). Then, the retouch operation unit 246 converts the gray scale of the brush image 734 to the color scale on the basis of the values of the color information corrected by the offset sampling function (Step S226).

Hereupon, when the color number capable of being rendered is specified by the color number 716s (Yes at Step S228), the retouch operation unit 246 gradates the scale of the brightness of the brush image 734 to the specified color number (Step S230). That is, the brightness of the brush image 734 becomes a stepwise scale. When the brush image 734 having the converted scale is rendered, the touch becomes like the cell animation style in which the number of colors is limited.

Next, the retouch operation unit 246 determines the size of rendering the brush image 734 having the determined rendering color and the quantity of shifting the rendering position of the brush image 734 to the sampling point P, and renders the brush image 734 (FIG. 18). First, the retouch operation unit 246 refers to the brush size 716c, and enlarges or reduces the brush image 734 (Step S232). Next, the retouch operation unit 246 determines the random number generation function in accordance with the condition of the random setting method 716g, and generates random numbers (Step S234). The retouch operation unit 246 rotates the brush image 734 in accordance with the rotation offset range 716k on the basis of the random numbers (Step S236). Then, the retouch operation unit 246 calculates the offset quantity of the X-direction and the Y-direction from the position coordinates of the sampling point P in accordance with the position offset range 716h and the position offset variation 716j, and offsets the rendering position (Step S238).

After determining the rendering position, the retouch operation unit 246 refers to the brush movement range 716f and the brush repeat number 716e (Step S240). Then, while changing the rendering position gradually in order that the brush repeat number 716e of brush images 734 may be contained in the brush movement range 716f, the retouch operation unit 246 renders the brush images 734 on the retouched image 746 (Step S242).

The retouch operation unit 246 executes the above-mentioned loop processing (2) to all of the sampling points P (Step S244), and then returns to the flow shown in FIG. 16.

In FIG. 16, the image generation operation unit 24 next generates the paint image 749 (Step S116). Then, the image synthesis unit 26 performs the image synthesis of the paint image 749 with the highlight retouched image 746 in conformity with the synthesis method specified by the synthesis condition setting 718 (Step S118).

Next, the image generation operation unit 24 generates the edge image 748 (Step S120). Then, the image synthesis unit 26 further performs the image synthesis of the image unit which has been before synthesized by the image synthesis with the edge image 748 in conformity with the synthesis method specified by the synthesis condition setting 718 (Step S122). In this state, the NPR image in which the highlight touch and the edge are synthesized with the paint image 749 has been produced. Then, the a value of the normal vector image 742 is stored in the NPR image (Step S124).

Next, the retouch operation unit 246 executes the retouched image generation processing to generate the shadow retouched image 747 (Step S126).

After generating the shadow retouched image 747, the image synthesis unit 26 performs the image synthesis of the highlight touch with the paint image 749, and the image synthesis of the NPR image having the synthesized edge with the shadow retouched image 747 in conformity with the synthesis method specified by the synthesis condition setting 718 (Step S128). Then, the results of the synthesis are stored in the storage unit 70 as the object synthesis image 752 (Step S130).

In this state, the NPR image in which the highlight touch, the shadow touch and the edge are synthesized with the paint image 749 has been completed.

After executing the loop processing (1) described above to all the objects to be displayed on the screen image (Step S132), the α synthesis of the object synthesis images 752 is executed to form the frame image 750 (Step S134). The frame image 750 is stored in the rendering frame buffer, and is displayed on the image display unit 30 as one frame of the moving image of the game screen (Step S136).

By the processing described above, the game screen can be displayed as the moving image of the NPR images including the handwriting style touches.

Structure of Hardware

Figure 20:
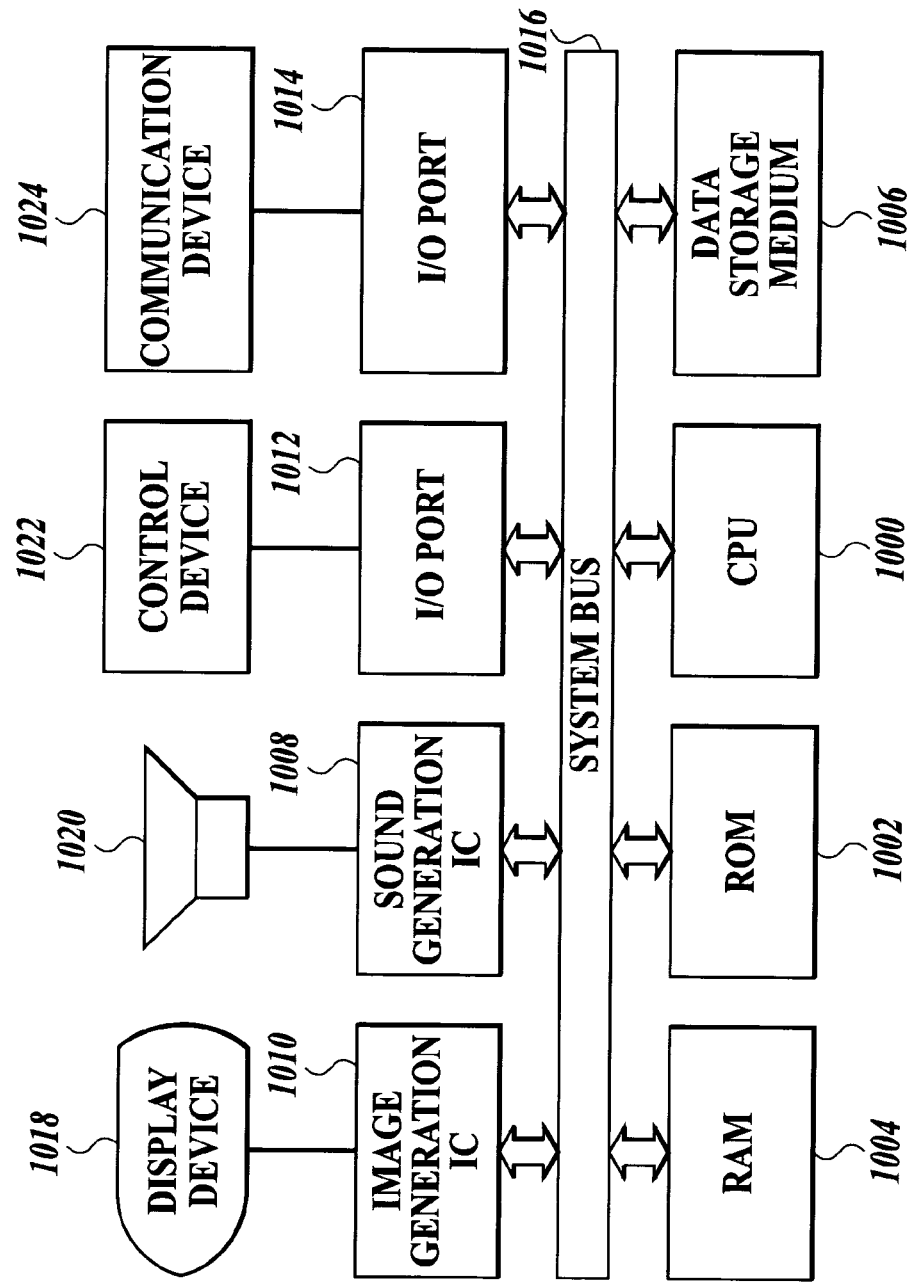
FIG. 20 is a view showing an example of a hardware structure for realizing the image generating apparatus 1300 of the first embodiment.

FIG. 20 is a diagram showing an example of the hardware structure realizable of the game apparatus 1300 in the first embodiment. The game apparatus 1300 comprises a CPU 1000, a ROM 1002, a RAM 1004, a data storage medium 1006, a sound generation IC 1008, an image generation IC 1010, and I/O ports 1012 and 1014, that are interconnected by a system bus 1016 so that data can be exchanged therebetween.

The CPU 1000 is equivalent to the processing unit 20 shown in FIG. 3. The CPU 1000 controls the whole apparatus and performs various data processing, according to programs stored in the data storage medium 1006, the system program stored in the ROM 1002, the operation signal inputted through the control device 1022, or the like.

The ROM 1002, the RAM 1004 and the data storage medium 1006 are equivalent to the storage unit 70 shown in FIG. 3.

The ROM 1002 is equivalent to the IC memory 1322 shown in FIG. 1, and stores programs or data predetermined for the game information 72. The RAM 1004 is storage means used as a work area or the like, for the CPU 1000. The RAM 1004 stores given data stored in the data storage medium 1006 or the ROM 1002, or results of the operation performed by the CPU 1000, therein. The data storage medium 1006 is equivalent to the CD-ROM 1118 shown in FIG. 1. The data storage medium 1006 is realized by an IC memory card, a hard disc unit capable of being attached to or detached from the apparatus, a MO or the like. The data storage medium 1006 mainly stores game play information (which is not shown in figures) obtained by the game operation unit 22.

The sound generation IC 1008 is an integrated circuit for generating operation sounds on the basis of data stored in the data storage medium 1006 or the ROM 1002. The sounds generated by the sound generation IC 1008 are outputted from the speaker 1020. The speaker 1020 corresponds to the speakers 1304 shown in FIG. 1.

The image generation IC 1010 is an integrated circuit for generating pixel data required to output the images to the display device 1018, on the basis of image data outputted from the RAM 1004, the ROM 1002, the data storage medium 1006 or the like. The display device 1018 is equivalent to the image display unit 30 shown in FIG. 3 or the display 1302 shown in FIG. 1.

The control device 1022 is connected to the I/O port 1012, and the communication device 1024 is connected to the I/O port 1014.

The control device 1022 is equivalent to the operation input unit 10 shown in FIG. 3. The control device 1022 corresponds to the operation panel, the joystick 1306, the push buttons 1308 or the like shown in FIG. 1, or the like. Therefore, the control device 1022 is used so that a player inputs various game operations according to the progress of the game to the apparatus body.

The communication device 1024 is a device for communicating various data used by the apparatus body with an external device. When the apparatus is connected with another apparatus, the communication device 1024 is used for communicating predetermined data corresponding to the program, the program or other data with another apparatus, through the communications line. For example, the communication device 1024 is incorporated in the control unit 1320 shown in FIG. 1.

The processing performed by the image generation IC 1010, the sound generation IC 1008 or the like is performed by the CPU 1000, a general-purpose DSP or the like, as a software.

According to the structure as described above, the retouch operation unit 246 arranges a plurality of the brush images 734 to generate the highlight retouched image 746 and the shadow retouched image 747. Consequently, the light and shade of the retouched image can be exhibited according to the number of the superposed brush images 734 or the like. Incidentally, the color information of the brush images 734 is not reflected at the part where the brush images 734 are not arranged or the number of the superposed brush images 734 is small, and the part becomes a transparent part. However, by synthesizing the paint image 749 with the retouched image, the color information of the surface of the object is reflected at the transparent part.

Consequently, it is unnecessary to generate the highlight retouched image 746 and the shadow retouched image 747 by spreading the brush images 734 all over the surfaces. As a result, the costs (processing time) required to generate the retouched image are decreased while the image of the object can have a pictorial tone.

Although the present invention has been explained according to the above-described embodiment, it should also be understood that the present invention is not limited to the first or second embodiment and various additions, changes and modifications may be made to the invention without departing from the gist thereof.

For example, the game apparatus 1300 may be any apparatus such as a consumer game apparatus, a portable game apparatus, a PDA, a multifunction computer or the like. Further, the game apparatus 1300 is not limited to a standalone apparatus, but may be configured to be realized by dispersing functions to a plurality of apparatus connected to a network.

Further, the sampling number 714g is not limited to be fixed, but may be suitably changeable. To put it more concretely, for example, when the sampling points setting processing is executed, the distance from the image center Ob of the object A to the virtual viewpoint C is first calculated, and then the sampling number 714g is changed in proportion to the distance.

Thereby, when the object A is arranged at a position distant from the virtual viewpoint C and the area in which the object A is rendered is small on the screen, touches are superposed on one another to be meaningless even if many touches are added. Accordingly, the sampling number 714g is reduced to a suitable number according to the distance, and thereby the load of processing is reduced. Conversely, when the object A is arranged near the virtual viewpoint C and the area in which the object A is rendered becomes large on the screen, the shortage of the touches can be supplemented by increasing the sampling number 714g.

Further, the brush size 716c is not limited to be fixed, but may be variable. For example, in Step S232 of the retouched image generation processing (FIG. 18), the distance from the image center Ob of the object A to the virtual viewpoint C is calculated, and the brush size 716c is varied in proportion to the distance. Accordingly, it is possible to set the touches of the object A distant from the virtual viewpoint C to be fine, and to set the touches of the object A near the virtual viewpoint C to be large.

Further, as to the generation of various pieces of image data, the paint image 749, the highlight retouched image 746, the shadow retouched image 747, the edge image 748, the normal vector image 742 and the shaded image 740 are not always limited to be generated by the image generation operation unit 24. In case it is necessary for a long time to generate complicated models or the like, they may be suitably prepared in advance to be used.

Further, the intense normal vector VI is not limited to be obtained on the basis of the normal vector image 742. It is needless to say that the normal vector VN may be read from, for example, the polygon data of the object suitably to be used as the intense normal vector VI.

According to the present invention, because a plurality of brush images are arranged to generate the retouched image, the light and shade of the retouched image can be exhibited according to the number of the superposed brush images or the like. Then, by synthesizing the projection image with the retouched image, it is possible to generate the handwriting style image reflecting the color information of the surface of the three-dimensional object. Consequently, it is not necessary for generating the retouched image by spreading the brush images all over the surface. For example, by generating the retouched image in which the brush images are arranged at a part of the surface of the three-dimensional object, the costs (processing time) for generating the retouched image can be decreased while the image of the whole three-dimensional object can have a pictorial tone.

The entire disclosure of Japanese Patent Application No. Tokugan 2002-274158 filed on Sep. 19, 2002 including specification, claims, drawings and summary are incorporated herein by reference in its entirety.

What is claimed is:

1. An image generating method for rendering a three-dimensional object viewed from a predetermined viewpoint by generating an image of the three-dimensional object and writing color information on the image generated in a rendering buffer, the method comprising:

generating at least one retouched image of the three-dimensional image at a display interval of still images when the retouched image is movie-displayed as an animation with the still images, by arranging a plurality of brush images so as to superpose a part of the plurality of brush images on another part of the plurality of brush images within a rendering region for the three-dimensional object, the rendering region being a region in which the three-dimensional object is projected on the basis of the predetermined viewpoint;

generating a projection image at the display interval, by projecting the three-dimensional object on the basis of the predetermined viewpoint; and rendering the image of the three-dimensional object so as to reflect color information of the projection image at a part at which the retouched image is transparent by synthesizing the retouched image with the projection image using at least one of multiplication synthesis and screen synthesis at the display interval to movie-play the retouched image as the animation with the still images, wherein the generating at least one of retouched image of the three-dimensional image includes:

operating a normal line to a surface of the three-dimensional object, by providing a first light source for emitting light rays in a first direction crossing at a right angle with an eyes line direction of the predetermined viewpoint and a second light source for emitting light rays in a second direction crossing at a right angle with the eyes line direction of the predetermined viewpoint, the second direction being different from the first direction, the first light source and the second light source being provided for calculating the normal line, irradiating the light rays emitted from the first light source and the light rays emitted from the second light source to the three-dimensional object when calculating the normal line, executing predetermined rendering processing on the basis of the predetermined viewpoint, and generating a normal image expressing the normal line to the surface of the three-dimensional object in color information, and performing processing for determining an arrangement angle of each of the plurality of brush images on the basis of the normal line operated for a position on the surface of the three-dimensional object, on the basis of color information at a position of the normal image, the position corresponding to an arrangement position at which each of the plurality of brush images is arranged, and arranging each of the plurality of brush images at the arrangement angle determined.

2. The image generating method as claimed in claim 1, further comprising generating an edge image of the three-dimensional object on the basis of the predetermined viewpoint, wherein the rendering the image of the three-dimensional object includes rendering the image of the three-dimensional object by synthesizing the retouched image, the projection image and the edge image.

3. The image generating method as claimed in claim 1, further comprising:

setting a light source in an object space in which the three-dimensional object is provided; and calculating shadow information of the three-dimensional object by performing predetermined rendering processing on the basis of the predetermined viewpoint and the light source set, wherein the arranging a plurality of brush images so as to superpose a part of the plurality of brush images on one another part of the plurality of brush images includes determining arrangement positions at which the plurality of brush images are arranged on the basis of the shadow information calculated.

4. The image generating method as claimed in claim 3, wherein the arranging a plurality of brush images so as to superpose a part of the plurality of brush images on one another part of the plurality of brush images includes determining the arrangement positions for the plurality of brush images so that density of the plurality of brush images in a low brightness part is higher than density of the plurality of brush images in a high brightness part on the basis of the shadow information calculated.

5. The image generating method as claimed in claim 3, wherein the arranging a plurality of brush images so as to superpose a part of the plurality of brush images on one another part of the plurality of brush images includes arranging the plurality of brush images at positions which satisfy a predetermined brightness condition within the rendering region on the basis of the shadow information calculated.

6. The image generating method as claimed in claim 5, wherein the arranging a plurality of brush images so as to superpose a part of the plurality of brush images on one another part of the plurality of brush images includes generating a first retouched image by arranging the plurality of brush images at positions which satisfy a first brightness condition and generating a second retouched image by arranging the plurality of brush images at positions which satisfy a second brightness condition within the rendering region on the basis of the shadow information.

7. The image generating method as claimed in claim 3, wherein the generating at least one of retouched image of the three-dimensional image includes generating at least one of retouched image by changing brightness information of the plurality of brush images on the basis of shadow information at positions at which the plurality of brush images are arranged.

8. The image generating method as claimed in claim 1, wherein the rendering buffer is formed so as to store RGB values for every pixel, the operating the normal line to the surface of the three-dimensional object includes generating the normal image by setting a light ray color of the first light source to be a first color of RGB and a light ray color of the second light source to be a second color of the RGB other than the first color, executing the predetermined rendering processing, and operating RGB values of each of pixels of the surface of the three-dimensional object, and the arranging each of the plurality of brush images includes determining the arrangement angle of each of the plurality of brush images at the arrangement position at which each of the plurality of brush images are arranged by operating a direction corresponding to the normal line at the arrangement position at which each of the plurality of brush images is arranged on the basis of a value of the light ray color of the first light source and a value of the light ray color of the second light source of RGB values of the normal image.

9. The image generating method as claimed in claim 1, further comprising operating a direction from a predetermined position of the normal image generated to the arrangement position at which each of the plurality of brush images is arranged, wherein the determining the arrangement angle of each of the plurality of brush images includes determining the arrangement angle of each of the plurality of brush images by synthesizing the direction operated with a direction obtained on the basis of the color information of the normal image.

10. The image generating method as claimed in claim 1, further comprising setting a light source in an object space in which the three-dimensional object is provided;

wherein the arranging each of the plurality of brush images includes determining the arrangement angle of each of the plurality of brush images by synthesizing a light ray direction of the light source set with the normal line to the surface of the three-dimensional object.

11. The image generating method as claimed in claim 1, wherein the generating at least one of retouched image of the three-dimensional image includes generating at least one of retouched image by changing a number of brush images to be arranged according to a predetermined condition.

12. The image generating method as claimed in claim 1, wherein the generating at least one of retouched image of the three-dimensional image includes generating at least one of retouched image by changing a size of each of the plurality of brush images to be arranged according to a predetermined condition.

13. The image generating method as claimed in claim 1, further comprising storing information on the plurality of brush images, wherein the generating at least one of retouched image of the three-dimensional image includes generating at least one of retouched image by selecting any one brush image to be arranged of the plurality of brush images according to a predetermined condition.

14. The image generating method as claimed in claim 1, wherein the arranging a plurality of brush images so as to superpose a part of the plurality of brush images on one another part of the plurality of brush images includes arranging the plurality of brush images so as to superpose a part of a predetermined number of brush images of the plurality of brush images on one another part of the plurality of brush images in a predetermined direction from a position at which any one brush image of the plurality of brush images when arranging the plurality of brush images.

15. The image generating method as claimed in claim 14, wherein the arranging a plurality of brush images so as to superpose a part of the plurality of brush images on one another part of the plurality of brush images includes arranging the plurality of brush images so as to superpose the part of the predetermined number of brush images of the plurality of brush images on one another part in the predetermined direction based on an arrangement angle of any one brush image of the plurality of brush images when arranging the plurality of brush images.

16. The image generating method as claimed in claim 1, wherein the generating at least one of retouched image of the three-dimensional image includes generating at least one of retouched image by shifting positions at which the plurality of brush images are arranged as time passes.

17. The image generating method as claimed in claim 1, wherein the generating at least one of retouched image of the three-dimensional image includes generating at least one of retouched image by shifting arrangement angles of the plurality of brush images as time passes.

18. A computer-readable storage medium on which instructions are recorded, such that the instructions, when loaded onto an operating apparatus comprising a processing unit, cause the processing unit to execute the method of claim 1.

19. An image generating apparatus for rendering a three-dimensional object viewed from a predetermined viewpoint by generating an image of the three-dimensional object and writing color information on the image generated in a rendering buffer, the apparatus comprising:

a retouched image generating section for generating at least one retouched image of the three-dimensional image at a display interval of still images when the retouched image is movie-displayed as an animation with the still images, by arranging a plurality of brush images so as to superpose a part of the plurality of brush images on one another part of the plurality of brush images within a rendering region for the three-dimensional object, the rendering region on which the three-dimensional object is projected on the basis of the predetermined viewpoint;

a projection image generating section for generating a projection image at the display interval, by projecting the three-dimensional object on the basis of the predetermined viewpoint; and a rendering section for rendering the image of the three-dimensional object so as to reflect color information of the projection image at a part at which the retouched image is transparent by synthesizing the retouched image with the projection image using at least one of multiplication synthesis and screen synthesis at the display interval to movie-display the retouched image as the animation with the still image, wherein the retouched imager generating section operates a normal line to a surface of the three-dimensional object, by providing a first liaht source for emitting light rays in a first direction crossing at a right angle with an eyes line direction of the predetermined viewpoint and a second light source for emitting light rays in a second direction crossing at a right angle with the eyes line direction of the predetermined viewpoint, the second direction being different from the first direction, the first light source and the second light source being provided for calculating the normal line, irradiating the light rays emitted from the first light source and the light rays emitted from the second light source to the three-dimensional object when calculating the normal line, executing predetermined rendering Processing on the basis of the predetermined viewpoint, and generating a normal image expressing the normal line to the surface of the three-dimensional object in color information, performs processing for determining an arrangement angle of each of the plurality of brush images on the basis of the normal line operated for a position on the surface of the three-dimensional object, on the basis of color information at a position of the normal image, the position corresponding to an arrangement position at which each of the plurality of brush images is arranged, and arranges each of the plurality of brush images at the arrangement angle determined.

* * * * *